(12) United States Patent
Kodama et al.

(10) Patent No.: US 9,663,154 B2
(45) Date of Patent: May 30, 2017

(54) RESISTANCE REDUCTION STRUCTURE FOR VEHICLE AND VEHICLE

(71) Applicant: The Yokohama Rubber Co., LTD., Minato-ku, Tokyo (JP)

(72) Inventors: Yuji Kodama, Hiratsuka (JP); Masataka Koishi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/893,004

(22) PCT Filed: May 26, 2014

(86) PCT No.: PCT/JP2014/063841
§ 371 (c)(1),
(2) Date: Nov. 20, 2015

(87) PCT Pub. No.: WO2014/192695
PCT Pub. Date: Dec. 1, 2014

(65) Prior Publication Data
US 2016/0107707 A1    Apr. 21, 2016

(30) Foreign Application Priority Data
May 27, 2013  (JP) .................. 2013-110873

(51) Int. Cl.
*B60K 31/00* (2006.01)
*B62D 35/00* (2006.01)
(Continued)

(52) U.S. Cl.
CPC ............... *B62D 35/00* (2013.01); *B60C 5/00* (2013.01); *B60C 13/00* (2013.01); *B60C 13/02* (2013.01);
(Continued)

(58) Field of Classification Search
CPC ........ B62D 35/00; B62D 25/16; B62D 25/18; B62D 35/02; B60C 5/00; B60C 13/00; B60C 13/02
See application file for complete search history.

(56) References Cited

U.S. PATENT DOCUMENTS

2011/0001334 A1   1/2011   Hirano
2014/0008000 A1   1/2014   Kubota et al.

FOREIGN PATENT DOCUMENTS

JP    2009067158    4/2009
JP    2009067159    4/2009
(Continued)

OTHER PUBLICATIONS

International Search Report for International Application No. PCT/JP2014/063841 dated Jun. 17, 2014, 4 pages, Japan.

*Primary Examiner* — Lori L Lyjak
(74) *Attorney, Agent, or Firm* — Thorpe North & Western

(57) ABSTRACT

A protrusion that projects from the inner wall surface of a tire house towards the rotational axis side is provided on the tire house side in a range from an edge of a tire cross-sectional width S that corresponds to a vehicle inner side of the pneumatic tire to a vehicle outer side. A plurality of ridges and/or recesses is provided on at least one tire side section on the pneumatic tire side. Where a maximum distance of the ridges from the surface of the tire side section is designated as Hp, a maximum distance of the recesses from the surface of the tire side section is designated as Hd, and the tire cross-sectional width of the pneumatic tire is designated as S, ranges $0.005 \leq Hp/S \leq 0.05$ and/or $0.001 \leq Hd/S \leq 0.01$ are satisfied.

15 Claims, 23 Drawing Sheets

(51) Int. Cl.
*B60C 13/02* (2006.01)
*B62D 25/16* (2006.01)
*B60C 13/00* (2006.01)
*B62D 25/18* (2006.01)
*B60C 5/00* (2006.01)
*B62D 35/02* (2006.01)

(52) U.S. Cl.
CPC ............ *B62D 25/16* (2013.01); *B62D 25/18* (2013.01); *B62D 35/02* (2013.01)

(56) References Cited

FOREIGN PATENT DOCUMENTS

| | | |
|---|---|---|
| JP | 2010260378 | 11/2010 |
| JP | 2013071680 | 4/2013 |
| WO | WO2009034813 | 3/2009 |
| WO | WO2009034814 | 3/2009 |

|  | CONVENTIONAL EXAMPLE | COMPARATIVE EXAMPLE 1 | COMPARATIVE EXAMPLE 2 | WORKING EXAMPLE 1 | WORKING EXAMPLE 2 |
| --- | --- | --- | --- | --- | --- |
| TIRE HOUSE PROTRUSION | - | - | ○ | ○ | ○ |
| PNEUMATIC TIRE RIDGE ARRANGEMENT | - | ○ VEHICLE INNER SIDE | - | ○ VEHICLE INNER SIDE | ○ VEHICLE OUTER SIDE |
| PNEUMATIC TIRE RECESS ARRANGEMENT | - | - | - | - | - |
| SPECIFICATION OF MAXIMUM DISTANCE OF RIDGE FROM TIRE SIDE SECTION SURFACE AND TIRE CROSS-SECTIONAL WIDTH [Hp/S] | - | 0.005 | - | 0.005 | - |
| SPECIFICATION OF MAXIMUM DISTANCE OF RECESSES FROM TIRE SIDE SECTION SURFACE AND TIRE CROSS-SECTIONAL WIDTH [Hd/S] | - | - | - | 0.001 | 0.001 |
| SPECIFICATION OF DISTANCE FROM PROTRUSION AND INNER WALL SURFACE TO ROTATIONAL AXIS AND VALUE OR CROSS-SECTIONAL WIDTH [(L-O)/r] | - | - | 0.009 | 0.009 | 0.009 |
| SPECIFICATION OF HEIGHT, WIDTH, AND NUMBER OF RIDGES [Np·hp/wp] | - | 5 | - | 5 | 5 |
| SPECIFICATION OF DEPTH, DIAMETER DIMENSION, AND NUMBER OF RECESSES [Nd·hd/wd] | - | - | - | - | - |
| HEIGHT OF RIDGES [mm] | - | 1 | - | 1 | 1 |
| DEPTH OF RECESSES [mm] | - | - | - | - | - |
| AIR RESISTANCE IMPROVEMENT RATIO | 100 | 100.1 | 100 | 100.2 | 100.1 |

FIG. 35A

| | WORKING EXAMPLE 3 | WORKING EXAMPLE 4 | WORKING EXAMPLE 5 | WORKING EXAMPLE 6 | WORKING EXAMPLE 7 | WORKING EXAMPLE 8 | WORKING EXAMPLE 9 |
|---|---|---|---|---|---|---|---|
| TIRE HOUSE PROTRUSION | ○ | ○ | ○ | ○ | ○ | ○ | ○ |
| PNEUMATIC TIRE RIDGE ARRANGEMENT | - | - | VEHICLE OUTER SIDE | VEHICLE OUTER SIDE | VEHICLE INNER SIDE | VEHICLE INNER SIDE | VEHICLE INNER SIDE |
| PNEUMATIC TIRE RECESS ARRANGEMENT | VEHICLE INNER SIDE | VEHICLE OUTER SIDE | VEHICLE INNER SIDE | VEHICLE INNER SIDE | VEHICLE OUTER SIDE | VEHICLE OUTER SIDE | VEHICLE OUTER SIDE |
| SPECIFICATION OF MAXIMUM DISTANCE OF RIDGE FROM TIRE SIDE SECTION SURFACE AND TIRE CROSS-SECTIONAL WIDTH [Hp/S] | - | 0.005 | 0.005 | 0.05 | 0.005 | 0.005 | 0.05 |
| SPECIFICATION OF MAXIMUM DISTANCE OF RECESSES FROM TIRE SIDE SECTION SURFACE AND TIRE CROSS-SECTIONAL WIDTH [Hd/S] | 0.001 | 0.001 | 0.001 | 0.01 | 0.001 | 0.01 | 0.01 |
| SPECIFICATION OF DISTANCE FROM PROTRUSION AND INNER WALL SURFACE TO ROTATIONAL AXIS AND VALUE OR CROSS-SECTIONAL WIDTH [(L-O)/r] | 0.009 | 0.009 | 0.009 | 0.009 | 0.009 | 0.009 | 0.009 |
| SPECIFICATION OF HEIGHT, WIDTH, AND NUMBER OF RIDGES [Np·hp/wp] | - | - | 5 | 5 | 5 | 5 | 5 |
| SPECIFICATION OF DEPTH, DIAMETER DIMENSION, AND NUMBER OF RECESSES [Nd·hd/wd] | 1 | 1 | 1 | 1 | 1 | 1 | 1 |
| HEIGHT OF RIDGES [mm] | - | - | 1 | 10 | 1 | 1 | 10 |
| DEPTH OF RECESSES [mm] | 0.3 | 0.3 | 0.3 | 2 | 0.3 | 2 | 2 |
| AIR RESISTANCE IMPROVEMENT RATIO | 100.1 | 100.2 | 100.2 | 100.3 | 100.3 | 100.3 | 100.4 |

FIG. 35B

| | WORKING EXAMPLE 10 | | WORKING EXAMPLE 11 | | WORKING EXAMPLE 12 | | WORKING EXAMPLE 13 | | WORKING EXAMPLE 14 | |
|---|---|---|---|---|---|---|---|---|---|---|
| TIRE HOUSE PROTRUSION | ○ | | ○ | | ○ | | ○ | | ○ | |
| PNEUMATIC TIRE RIDGE ARRANGEMENT | VEHICLE INNER SIDE | VEHICLE OUTER SIDE | VEHICLE INNER SIDE | VEHICLE OUTER SIDE | VEHICLE INNER SIDE | VEHICLE OUTER SIDE | VEHICLE INNER SIDE | VEHICLE OUTER SIDE | VEHICLE INNER SIDE | VEHICLE OUTER SIDE |
| PNEUMATIC TIRE RECESS ARRANGEMENT | ○ | ○ | ○ | ○ | ○ | ○ | ○ | ○ | ○ | ○ |
| SPECIFICATION OF MAXIMUM DISTANCE OF RIDGE FROM TIRE SIDE SECTION SURFACE AND TIRE CROSS-SECTIONAL WIDTH [Hp/S] | 0.02 | 0.005 | 0.02 | 0.005 | 0.02 | 0.005 | 0.02 | 0.005 | 0.02 | 0.005 |
| SPECIFICATION OF MAXIMUM DISTANCE OF RECESSES FROM TIRE SIDE SECTION SURFACE AND TIRE CROSS-SECTIONAL WIDTH [Hd/S] | 0.01 | | 0.5 | | 0.2 | | 0.2 | | 0.2 | |
| SPECIFICATION OF DISTANCE FROM PROTRUSION AND INNER WALL SURFACE TO ROTATIONAL AXIS AND VALUE OR CROSS-SECTIONAL WIDTH [(L-O)/r] | 5 | | 5 | | 5 | | 200 | | 100 | |
| SPECIFICATION OF HEIGHT, WIDTH, AND NUMBER OF RIDGES [Np·hp/wp] | 1 | | 1 | | 1 | | 1 | | 1 | |
| SPECIFICATION OF DEPTH, DIAMETER, DIMENSION, AND NUMBER OF RECESSES [Nd·hd/wd] | 5 | | 5 | | 5 | | 5 | | 5 | |
| HEIGHT OF RIDGES [mm] | 1 | | 1 | | 1 | | 1 | | 1 | |
| DEPTH OF RECESSES [mm] | 100.5 | | 100.7 | | 100.6 | | 100.8 | | 100.7 | |
| AIR RESISTANCE IMPROVEMENT RATIO | | | | | | | | | | |

FIG. 36A

| | WORKING EXAMPLE 15 | WORKING EXAMPLE 16 | WORKING EXAMPLE 17 | WORKING EXAMPLE 18 | WORKING EXAMPLE 19 | WORKING EXAMPLE 20 |
|---|---|---|---|---|---|---|
| TIRE HOUSE PROTRUSION | ◯ | ◯ | ◯ | ◯ | ◯ | ◯ |
| PNEUMATIC TIRE RIDGE ARRANGEMENT | VEHICLE INNER SIDE | VEHICLE INNER SIDE | VEHICLE INNER SIDE | VEHICLE INNER SIDE | VEHICLE INNER SIDE | VEHICLE INNER SIDE |
| PNEUMATIC TIRE RECESS ARRANGEMENT | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE |
| SPECIFICATION OF MAXIMUM DISTANCE OF RIDGE FROM TIRE SIDE SECTION SURFACE AND TIRE CROSS-SECTIONAL WIDTH [Hp/S] | 0.02 | 0.02 | 0.05 | 0.02 | 0.02 | 0.05 |
| SPECIFICATION OF MAXIMUM DISTANCE OF RECESSES FROM TIRE SIDE SECTION SURFACE AND TIRE CROSS-SECTIONAL WIDTH [Hd/S] | 0.005 | 0.005 | 0.005 | 0.005 | 0.01 | 0.01 |
| SPECIFICATION OF DISTANCE FROM PROTRUSION AND INNER WALL SURFACE TO ROTATIONAL AXIS AND VALUE OR CROSS-SECTIONAL WIDTH [(L−O)/r] | 0.2 | 0.2 | 0.2 | 0.2 | 0.2 | 0.2 |
| SPECIFICATION OF HEIGHT, WIDTH, AND NUMBER OF RIDGES [Np · hp/wp] | 100 | 100 | 100 | 100 | 100 | 100 |
| SPECIFICATION OF DEPTH, DIMENSION, AND NUMBER OF RECESSES [Nd · hd/wd] | 10000 | 5000 | 5000 | 20 | 20 | 20 |
| HEIGHT OF RIDGES [mm] | 5 | 5 | 10 | 10 | 5 | 10 |
| DEPTH OF RECESSES [mm] | 1 | 1 | 1 | 1 | 2 | 2 |
| AIR RESISTANCE IMPROVEMENT RATIO | 100.9 | 100.8 | 101 | 101.2 | 101.5 | 101.8 |

FIG. 36B

RESISTANCE REDUCTION STRUCTURE FOR VEHICLE AND VEHICLE

TECHNICAL FIELD

The present technology relates to a vehicle air resistance reduction structure that improves the air flow around the circumference of tires, and a vehicle.

BACKGROUND

Conventionally, for example, in Japanese Unexamined Patent Application Publication No. 2010-260378, a pneumatic tire is described in which a plurality of ridges (projections) extending in the tire radial direction is provided at predetermined intervals in the tire circumferential direction on the tire side section (tire side surface) on the inner side in the vehicle width direction when mounted on a vehicle, and a plurality of recesses is provided over the tire circumferential direction and the tire radial direction on the tire side section that corresponds to the outer side in the vehicle width direction when mounted on a vehicle. When mounted on a vehicle, air flows uniformly toward the rear on the outer side in the vehicle width direction, but on the inner side in the vehicle width direction, the tire is disposed within the tire house, and other components such as the axle and the like are disposed nearby, so the flow of the air is easily disturbed. According to this pneumatic tire, an air flow distribution promotion effect and straightening effect are obtained and the air resistance is reduced by the ridges provided on the tire side section on the inner side in the vehicle width direction of the vehicle where the air flow is easily disturbed, and turbulent flow at the periphery of the tire is produced when the vehicle is traveling by the recesses provided on the tire side section on the outer side in the vehicle width direction of the vehicle, and drag that tends to pull the tire backward due to the low pressure portion produced to the rear of the tire when traveling is reduced, so the fuel economy is improved.

According to the technology of Japanese Unexamined Patent Application Publication No. 2010-260378, the air flow around the tire when the vehicle is traveling is improved by the ridges and recesses provided in the pneumatic tire. However, the pneumatic tires are disposed within the tire house of the vehicle, so the inventors have discovered that there is also scope for improvement at the tire house side.

SUMMARY

The present technology provides a vehicle air resistance reduction structure that is capable of improving the air flow around the tire circumference of pneumatic tires disposed within tire houses, and reduce the air resistance of the vehicle and a vehicle capable of the same.

A vehicle air resistance reduction structure according to the present technology includes a tire house of a vehicle, and a pneumatic tire disposed within the tire house. In the state in which the pneumatic tire is mounted on the vehicle, and a rotational axis of the pneumatic tire is disposed so that the vehicle can move forward, a protrusion that projects from an inner wall surface of the tire house towards the rotational axis side is provided on the tire house side in a range from a tire cross-sectional width edge that corresponds to a vehicle inner side of the pneumatic tire to a vehicle outer side. A plurality of ridges and/or recesses is provided on at least one tire side sections on the pneumatic tire side. Upon a maximum distance of the ridges from a surface of the tire side section being Hp, a maximum distance of the recesses from the surface of the tire side section being Hd, and a tire cross-sectional width of the pneumatic tire being S, ranges $0.005 \leq Hp/S \leq 0.05$ and/or $0.001 \leq Hd/S \leq 0.01$ are satisfied.

According to this vehicle air resistance reduction structure, ridges satisfying the range $0.005 \leq Hp/S \leq 0.05$ or recesses satisfying the range $0.001 \leq Hd/S \leq 0.01$ are provided on the tire side section of the pneumatic tire, and the protrusion projecting from the inner wall surface of the tire house is provided. Therefore an air flow distribution promotion effect and straightening effect is produced by the ridges on the flow of air from the leading side to the trailing side of the vehicle. Also, the flow of air from the leading side to the trailing side of the vehicle is made turbulent by the recesses, so the drag tending to pull to the rear caused by the low pressure produced to the rear of the pneumatic tire when traveling is reduced. In addition, as a result of the protrusion of the tire house, the flow of air on the vehicle inner side of the protrusion is suppressed from flowing out in the vehicle outer side, and by enclosing the air within the tire house, the air flow distribution promotion effect and straightening effect due to the ridges and the turbulence of the air due to the recesses is assisted. Therefore, a turbulent flow boundary layer is generated on the periphery of the pneumatic tire, so on the vehicle inner side, expansion of air that escapes to the vehicle outer side to the rear of the vehicle is suppressed, and on the vehicle outer side, expansion of the air passing the vehicle outer side of the pneumatic tire is suppressed. As a result, the spread of the passing air is suppressed, so the air resistance of the vehicle can be reduced. In this manner, the fuel economy of the vehicle can be improved.

Also, in the vehicle air resistance reduction structure according to the present technology, in the range from the tire cross-sectional width edge that corresponds to the vehicle inner side of the pneumatic tire to the vehicle outer side, upon a shortest distance from a projecting tip of the protrusion to the rotational axis being O, a maximum value of a shortest distance from the inner wall surface of the tire house to the rotational axis being L, and a tire radius being r, a range $0.01 \leq (L-O)/r \leq 0.5$ is satisfied.

According to this vehicle air resistance production structure, by making $(L-O)/r$ not less than 0.01, the height of projection of the protrusions from the inner wall surface is sufficient, and the flow of air on the vehicle inner side is prevented from flowing out towards the vehicle outer side by the protrusions, and by enclosing the air within the tire house, a significant effect of assisting the air flow distribution promotion effect and straightening effect due to the ridges and assisting the turbulence of the air due to the recesses can be obtained. On the other hand, by making $(L-O)/r$ not more than 0.5, the protrusion is prevented from projecting too much from the inner wall surface, and it is possible to prevent the protrusion from interfering with the flow of air. In other words, when $(L-O)/r$ is greater than 0.5, the effect of enclosing the air within the tire house tends to be excessive, and stagnation in the flow of air can easily occur in the space on the vehicle inner side of the protrusion, so there is a possibility that the air flow distribution promotion effect and straightening effect due to the ridges and the effect of the turbulence of the air due to the recesses will be reduced.

Also, in the vehicle air resistance reduction structure according to the present technology, the plurality of ridges provided on the pneumatic tire extend longitudinally from an inner side to an outer side in a tire radial direction, and is disposed at intervals in a tire circumferential direction, and upon a height of projection from the surface of the tire side section being hp, the width in the longitudinal direction being wp, and a number of the ridges on one of the tire side sections 11 being Np, a range $5 \leq Np \cdot hp/wp \leq 200$ is satisfied.

If the projection height hp of the ridges is too small relative to the width wp in the lateral direction, the projection height hp of the ridges tends to be too low, and the range of the ridges in contact with the flow of air is small, so it is difficult to obtain a more significant air flow distribution promotion effect and straightening effect due to the ridges. On the other hand, if the projection height hp of the ridges is too large relative to the width wp in the lateral direction, the projection height hp of the ridges tends to be too high, and the range of the ridges in contact with the flow of air is large, so the ridges provide air resistance, and the air flow distribution promotion effect and straightening effect due to the ridges is reduced. Also, if the number Np of ridges is too small relative to the width wp in the lateral direction, the range of the ridges in contact with the flow of air is small, so it is difficult to obtain a more significant air flow distribution promotion effect and straightening effect due to the ridges. On the other hand, if the number Np of the ridges is too large relative to the width wp in the lateral direction, the range of the ridges in contact with the flow of air is large, so the ridges provide air resistance, and the air flow distribution promotion effect and straightening effect due to the ridges is reduced. Therefore, by making the relationship between the projection height hp of the ridges, the width wp of the ridges in the lateral direction, and the number Np of the ridges on one of the tire side sections appropriate, it is possible to obtain a significant air flow distribution promotion effect and straightening effect due to the ridges.

Also, in the vehicle air resistance reduction structure according to the present technology, in the case of the recesses provided on the pneumatic tire, upon a depth of the recess from the surface of the tire side section being hd, a diameter dimension of an opening being wd, and a number of the recesses on one of the tire side sections being Nd, the range $1 \leq Nd \cdot hd/wd \leq 10000$ is satisfied.

When the depth hd of the recesses is too small relative to the diameter dimension wd, the depth hd of the recesses tends to be too shallow, and the effect of turbulence in the air due to the recesses is reduced. On the other hand, when the depth hd of the recesses is too large relative to the diameter dimension wd, the depth hd of the recesses tends to be too deep, and there is a possibility that the difference in height at the recesses will cause air resistance. Also, when the number Nd of the recesses is too small relative to the diameter dimension wd, the range of the recesses in contact with the flow of air is small, so the effect of disturbance of the air due to the recesses is reduced. On the other hand, when the number Nd of the recesses is too large relative to the diameter dimension wd, the range of the recesses in contact with the flow of air is large, so there is a possibility that the recesses will cause air resistance. Therefore, by making the relationship between the depth hd of the recesses, the diameter dimension wd of the opening of the recesses, and the number Nd of the recesses on one of the tire side sections appropriate, a significant effect of turbulence of the air due to the recesses can be obtained.

Also, in the vehicle air resistance reduction structure according to the present technology, the height of projection of the ridges provided on the pneumatic tire from the surface of the tire side section satisfies a range of not less than 1 mm and not more than 10 mm.

If the height of projection hp of the ridges is less than 1 mm, it is difficult to obtain a significant air flow distribution promotion effect and straightening effect due to the ridges. On the other hand, if the height of projection hp of the ridges exceeds 10 mm, the range over which the ridges contact the air flow will be large, so the ridges will increase the air resistance and the air flow distribution promotion effect and straightening effect will be reduced. Therefore, by making the projection height hp of the ridges not less than 1 mm and not more than 10 mm, a significant air flow distribution promotion effect and straightening effect due to the ridges can be obtained.

Also, in the vehicle air resistance reduction structure according to the present technology, the depth hd of the recesses provided on the pneumatic tire from the surface of the tire side section satisfies a range of not less than 0.3 mm and not more than 2 mm.

When the depth hd of the recesses is less than 0.3 mm, the effect of turbulence of the air due to the recesses is reduced. On the other hand, when the depth hd of the recesses exceeds 2 mm, there is a possibility that the difference in height at the recesses will cause air resistance. Therefore, by making the depth hd of the recesses within the range of not less than 0.3 mm and not more than 2 mm, a significant effect of turbulence of the air due to the recesses can be obtained.

Also, in the vehicle air resistance reduction structure according to the present technology, the ridges provided on the pneumatic tire are disposed on the tire side section that corresponds to the vehicle inner side when the pneumatic tire is mounted on the vehicle.

According to this vehicle air resistance reduction structure, by disposing the ridges on the tire side section corresponding to the vehicle inner side of the pneumatic tire mounted on the vehicle, it is possible to obtain a significant reduction in the expansion of the air passing to the vehicle outer side at the vehicle trailing side due to the air flow distribution promotion effect and straightening effect due to the ridges in the flow of air passing from the vehicle leading side to the vehicle trailing side between the pneumatic tire and the vehicle.

Also, in the vehicle air resistance reduction structure according to the present technology, the recesses provided on the pneumatic tire are disposed on the tire side section that corresponds to the vehicle outer side when the pneumatic tire is mounted on the vehicle.

According to this vehicle air resistance reduction structure, by disposing the recesses on the tire side section corresponding to the vehicle outer side of the pneumatic tire mounted on the vehicle, it is possible to obtain a significant reduction in the expansion of the air passing the vehicle outer side of the pneumatic tire due to the air turbulence due to the recesses in the flow of air passing from the vehicle leading side to the vehicle trailing side on the vehicle outer side.

In order to solve the problem and achieve the object described above, the vehicle according to the present technology includes a tire house and a pneumatic tire disposed within the tire house, the vehicle being characterized in that any one of the vehicle air resistance reduction structures described above is applied.

According to this vehicle, the air flow distribution promotion effect and straightening effect due to the ridges of the pneumatic tire are produced on the flow of air from the leading side to the trailing side of the vehicle. Also, the flow of air from the leading side to the trailing side of the vehicle is made turbulent by the recesses of the pneumatic tire, so the drag tending to pull to the rear caused by the low pressure produced to the rear of the pneumatic tire when traveling is reduced. In addition, as a result of the protrusion of the tire house, the flow of air on the vehicle inner side of the protrusion is suppressed from flowing out to the vehicle outer side, and by enclosing the air within the tire house, the air flow distribution promotion effect and straightening effect due to the ridges and the turbulence of the air due to the recesses is assisted. Therefore, a turbulent flow boundary layer is generated on the periphery of the pneumatic tire, so on the vehicle inner side, expansion of air that escapes to the vehicle outer side at the vehicle trailing side is suppressed, and on the vehicle outer side, expansion of the air passing the vehicle outer side of the pneumatic tire is suppressed. As a result, the spread of the passing air is suppressed, so the air resistance of the vehicle can be reduced. In this manner, the fuel economy of the vehicle can be improved.

The vehicle air resistance reduction structure and vehicle according to the present technology are capable of improving the air flow around the circumference of pneumatic tires disposed within the tire houses, and reducing the air resistance of the vehicle.

BRIEF DESCRIPTION OF THE DRAWINGS

FIGS. 35A-35B include a table showing the results of simulation tests for working examples of the present technology.

FIGS. 36A-36B include a table showing the results of simulation tests for working examples of the present technology.

DETAILED DESCRIPTION

Embodiments of the present technology are described in detail below with reference to the drawings. However, the present technology is not limited by the embodiments. Further, components of the embodiments include elements that may be easily replaced by those skilled in the art or that are substantially identical to components of the embodiments. Furthermore, a plurality of modified examples described in the embodiments may be combined as desired within the scope of obviousness by those skilled in the art.

Figure 1:
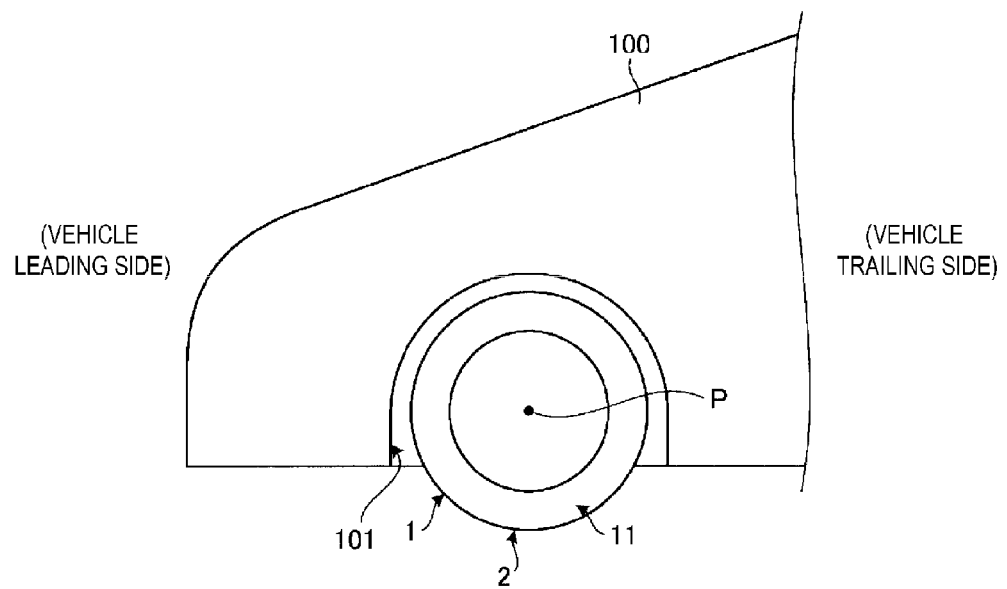
FIG. 1 is a schematic side view illustrating a portion of a vehicle to which the vehicle air resistance reduction structure according to an embodiment of the present technology has been applied.
Figure 2:
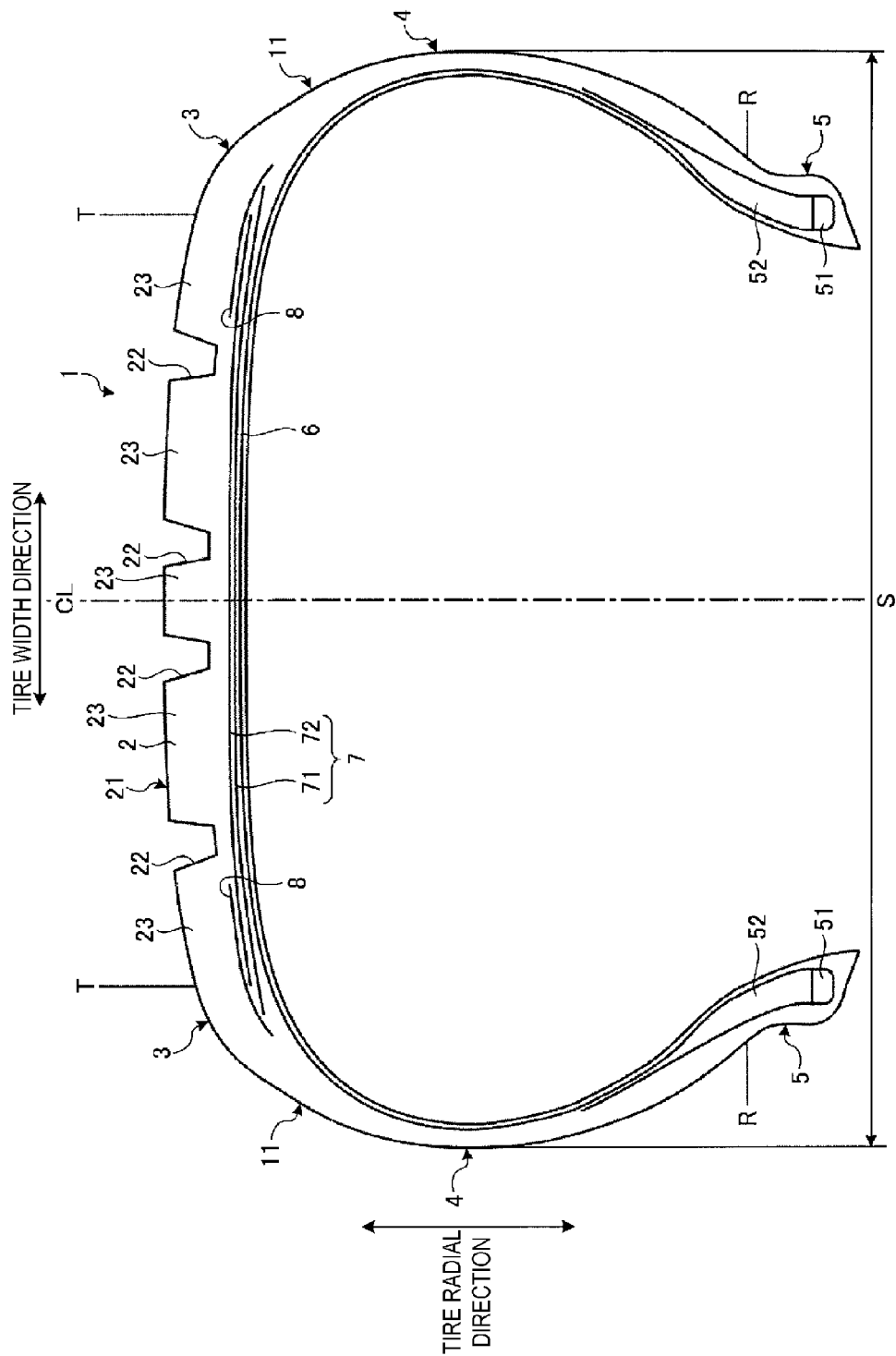
FIG. 2 is a meridian cross-sectional view illustrating an example of a pneumatic tire of the vehicle air resistance reduction structure according to an embodiment of the present technology.

FIG. 1 is a schematic side view illustrating a portion of a vehicle to which the vehicle air resistance reduction structure according to the present embodiment has been applied, and FIG. 2 is a meridian cross-sectional view illustrating an example of a pneumatic tire of the vehicle air resistance reduction structure according to an embodiment of the present technology.

In the following description, "tire radial direction" refers to a direction orthogonal to the rotational axis P of the pneumatic tire 1; "inner side in the tire radial direction" refers to a side facing the rotational axis P in the tire radial direction; and "outer side in the tire radial direction" refers to a side distanced from the rotational axis P in the tire radial direction. The "tire circumferential direction" refers to a circumferential direction with the rotational axis P as the center axis. Additionally, "tire width direction" refers to a direction parallel to the rotational axis P. "Inner side in the tire width direction" refers to a side facing a tire equatorial plane CL (tire equatorial line) in the tire width direction, and "outer side in the tire width direction" refers to a side distanced from the tire equatorial plane CL in the tire width direction. "Tire equatorial plane CL" refers to a plane that is orthogonal to the rotational axis P of the pneumatic tire 1 and that passes through a center in the tire width direction of the pneumatic tire 1. "Tire width" is a width in the tire width direction between constituents located to the outer side in the tire width direction, or in other words, the distance between the constituents that are most distant in the tire width direction from the tire equatorial plane CL. "Tire equatorial line" refers to a line along the tire circumferential direction of the pneumatic tire 1 that lies on the tire equatorial plane CL. In the present embodiment, the tire equatorial line uses the same reference sign CL as the tire equatorial plane.

Also, when the pneumatic tire 1 is fitted to a vehicle 100, in the tire width direction of the pneumatic tire 1, the side facing the inner side of the vehicle 100 is referred to as the vehicle inner side, and the side facing the outer side of the vehicle is referred to as the vehicle outer side.

As illustrated in FIG. 1, the vehicle air resistance reduction structure according to the present embodiment includes a tire house 101 of the vehicle 100, and a pneumatic tire 1 disposed within the tire house 101. Note that in FIG. 1, the tire house 101 and the pneumatic tire 1 of the vehicle leading side portion of a passenger vehicle is illustrated. Although not illustrated on the drawings, the vehicle air resistance reduction structure according to the present embodiment also includes the tire house 101 and the pneumatic tire 1 of the vehicle trailing side portion of the passenger vehicle.

The tire house 101 is provided on the inner side of a fender of the vehicle 100, thereby ensuring space to allow the pneumatic tire 1 to rotate, when the pneumatic tire 1 fitted to a rim is mounted on the vehicle 100. The tire house 101 includes an opening on the vehicle outer side and lower side, and an inner wall surface 101a that covers the periphery of the pneumatic tire 1 excluding the lower portion (see FIG. 3). The tire house 101 is provided on the side of the vehicle 100 supporting the rotational axis P of the pneumatic tire 1.

As illustrated in FIG. 2, the pneumatic tire 1 includes a tread portion 2, shoulder portions 3 on both sides of the tread portion 2, and sidewall portions 4 and bead portions 5 continuing sequentially from the respective shoulder portions 3. Additionally, the pneumatic tire 1 includes a carcass layer 6, a belt layer 7, and a belt reinforcing layer 8.

The tread portion 2 is formed from a rubber material (tread rubber), is exposed on the outermost side in the tire radial direction of the pneumatic tire 1, and the surface thereof constitutes the outline profile of the pneumatic tire 1. A tread surface 21 is formed on an outer peripheral surface of the tread portion 2 or, rather, on a road contact surface that comes in contact with a road surface during driving. The tread surface 21 has a plurality (four in the present embodiment) of main grooves 22 provided therein, extending in the tire circumferential direction, the main grooves 22 being straight main grooves parallel to the tire equatorial line CL. Moreover, a plurality of rib-like land portions 23 extending in the tire circumferential direction and parallel with the tire equator line CL is defined in the tread surface 21 by the plurality of main grooves 22. Additionally, while not illustrated in the drawings, lug grooves that intersect with the main grooves 22 in each of the land portions 23 are provided in the tread surface 21. The land portions 23 are plurally divided in the tire circumferential direction by the lug grooves. Additionally, the lug grooves are formed so as to open to an outermost side in the tire width direction of the tread portion 2, that is, the outer side in the tire width direction. Note that the lug grooves may have a form that communicates with the main grooves 22 or may have a form that does not communicate with the main grooves 22.

The shoulder portions 3 are locations on both outer sides in the tire width direction of the tread portion 2. Additionally, the sidewall portions 4 are exposed on the outermost sides of the pneumatic tire 1 in the tire width direction. The bead portions 5 include a bead core 51 and a bead filler 52. The bead core 51 is formed by winding a bead wire, which is a steel wire, into an annular shape. The bead filler 52 is a rubber material that is disposed in space formed by an end of the carcass layer 6 in the tire width direction being folded back at the position of the bead core 51.

The ends of the carcass layer 6 in the tire width direction are folded over the pair of bead cores 51 from the inner side in the tire width direction outward in the tire width direction, and the carcass layer 6 is stretched in a toroidal shape in the tire circumferential direction to form the framework of the tire. The carcass layer 6 is constituted by a plurality of carcass cords (not illustrated) disposed parallel to each other in the tire circumferential direction along a tire meridian direction at a given angle with respect to the tire circumferential direction and covered by a coating rubber. The carcass cords are formed from organic fibers (e.g., polyester, rayon, nylon, or the like). The carcass layer 6 is provided with at least one layer.

The belt layer 7 has a multi-layer structure in which at least two layers (belts 71 and 72) are laminated; is disposed in the tread portion 2 on an outer side in the tire radial direction corresponding to the periphery of the carcass layer 6; and covers the carcass layer 6 in the tire circumferential direction. The belts 71 and 72 include a plurality of cords (not illustrated) disposed parallel to each other at a predetermined angle with respect to the tire circumferential direction (for example, from 20° to 30°), and covered by a coating rubber. The cords are formed from steel or organic fibers (polyester, rayon, nylon, or the like). Moreover, the belts 71 and 72 that overlap each other are disposed so that the cords of the respective belts intersect each other.

The belt reinforcing layer 8 is disposed on the outer side in the tire radial direction at the periphery of the belt layer 7, and covers the belt layer 7 in the tire circumferential direction. The belt reinforcing layer 8 includes a plurality of cords (not illustrated) disposed parallel to each other in the tire width direction and substantially parallel (±5°) to the tire circumferential direction, which are covered by a coating rubber. The cords are formed from steel or organic fibers (polyester, rayon, nylon, or the like). The belt reinforcing layer 8 illustrated in FIG. 2 is disposed so as to cover end portions of the belt layer 7 in the tire width direction. The configuration of the belt reinforcing layer 8 is not limited to that described above. Although not illustrated in the drawings, a configuration may be used where the belt reinforcing layer 8 is disposed so as to cover the entirety of the belt layer 7. Alternatively, for example, a configuration having two reinforcing layers may be used, where the belt reinforcing layer 8 is formed so that the reinforcing layer on the inner side in the tire radial direction is longer in the tire width direction than the belt layer 7 and is disposed so as to cover the entirety of the belt layer 7, and the reinforcing layer on the outer side in the tire radial direction is disposed so as only to cover the end portions of the belt layer 7 in the tire width direction. Alternatively, for example, a configuration having two reinforcing layers may be used, where each of the reinforcing layers is disposed so as only to cover the end portions of the belt layer 7 in the tire width direction. In other words, the belt reinforcing layer 8 overlaps at least the end portions of the belt layer 7 in the tire width direction. Additionally, the belt reinforcing layer 8 is provided by winding band-like strip material (e.g. having a width of 10 mm) in the tire circumferential direction.

FIGS. 3 to 6 are schematic plan views of a tire house of the vehicle air resistance reduction structure according to the present embodiment. In the configuration of the tire house 101 as described above, as illustrated in FIGS. 3 to 6, a protrusion 101b that projects towards the pneumatic tire 1 is provided in the inner wall surface 101a of the tire house 101 in the vehicle air resistance reduction structure according to the present embodiment. Preferably the protrusion 101b is formed plate-like along the shape of the tire house 101 covering the periphery of the pneumatic tire 1. The protrusion 101b, with reference to FIG. 1, is provided continuously along the shape of the tire house 101 covering the periphery of the pneumatic tire 1, or is provided intermittently along the shape of the tire house 101 that covers the periphery of the pneumatic tire 1, or is provided partially on the shape of the tire house 101 that covers the periphery of the pneumatic tire 1.

Figure 3:
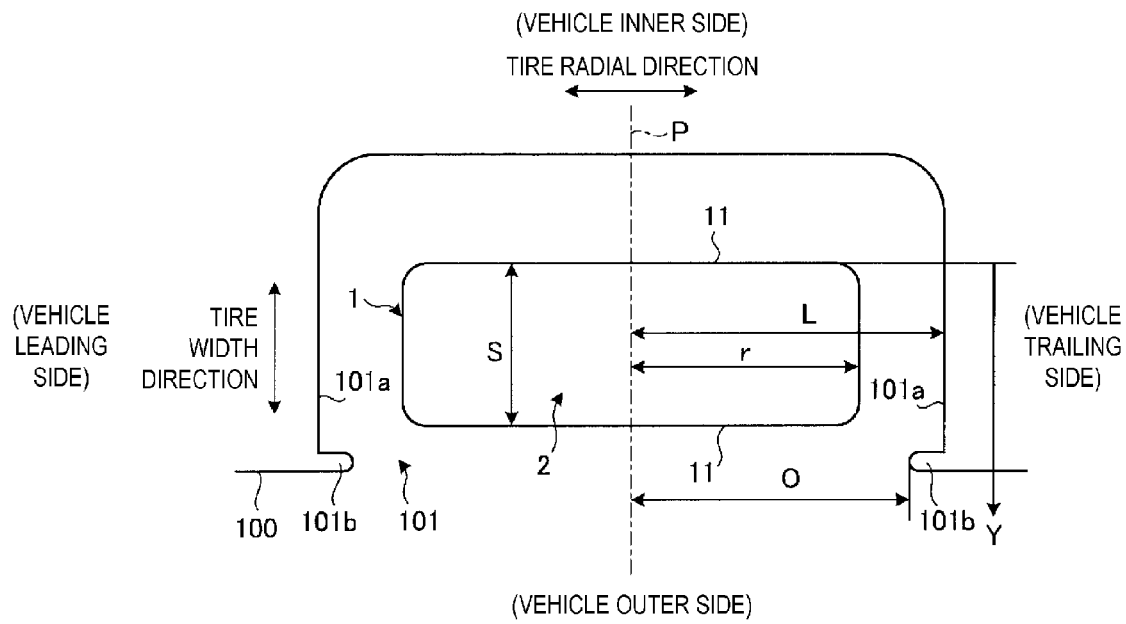
FIG. 3 is a schematic plan view of a tire house of the vehicle air resistance reduction structure according to an embodiment of the present technology.
Figure 4:
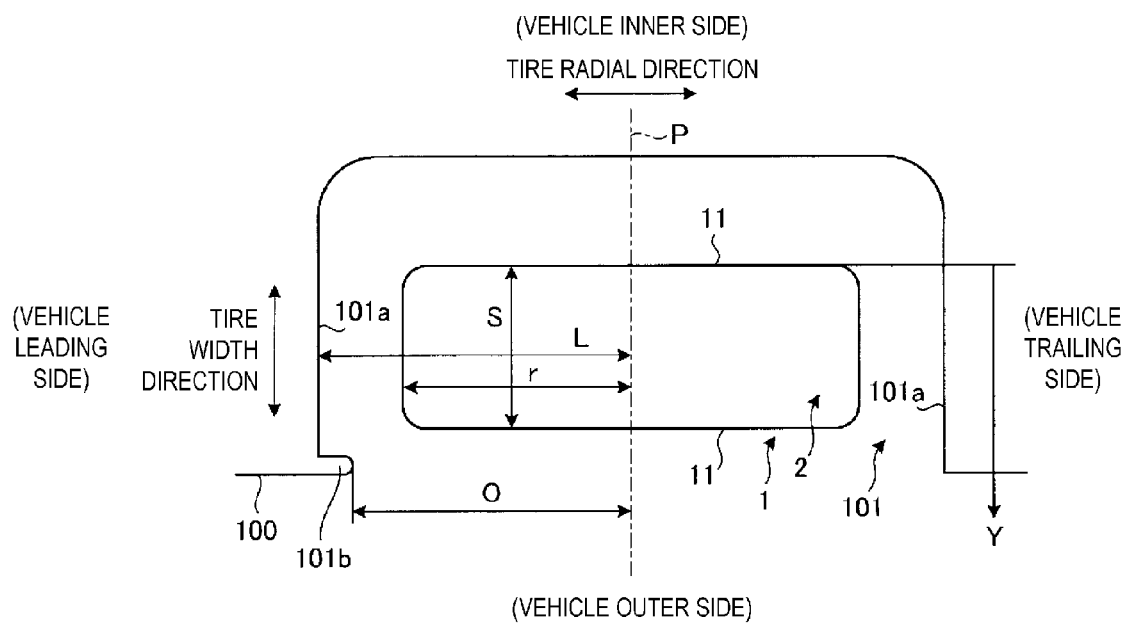
FIG. 4 is a schematic plan view of a tire house of the vehicle air resistance reduction structure according to an embodiment of the present technology.
Figure 5:
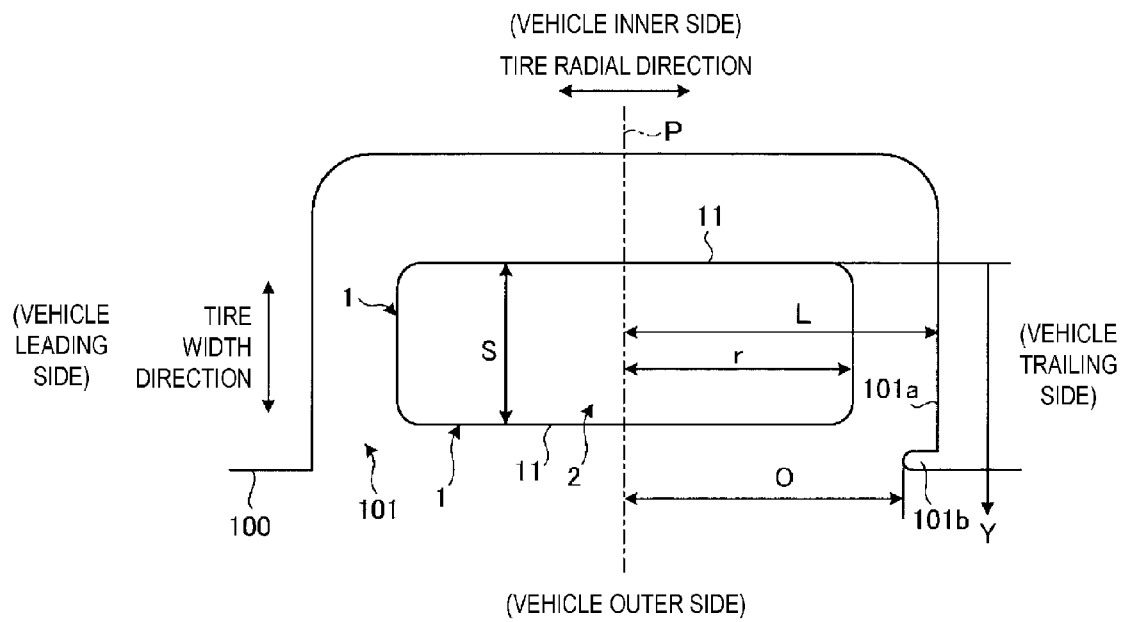
FIG. 5 is a schematic plan view of a tire house of the vehicle air resistance reduction structure according to an embodiment of the present technology.

FIG. 3 illustrates a form in which the protrusion 101b is provided partially at opposite positions on the vehicle leading side and the vehicle trailing side with the rotational axis P of the pneumatic tire 1 therebetween. Also, FIG. 4 illustrates a form in which the protrusion 101b is provided partially on the vehicle leading side. Also, FIG. 5 illustrates a form in which the protrusion 101b is provided partially on the vehicle trailing side. Note that, although not illustrated on the drawings, the protrusion 101b may be provided partially at the top of the tire house 101 covering the periphery of the pneumatic tire 1.

Figure 6:
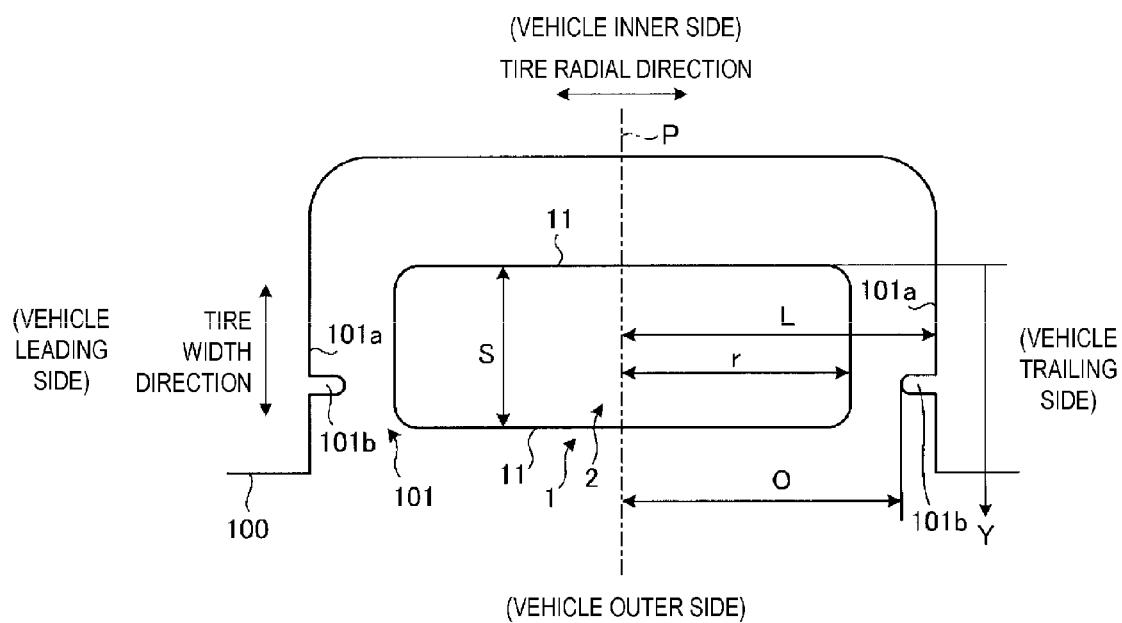
FIG. 6 is a schematic plan view of a tire house of the vehicle air resistance reduction structure according to an embodiment of the present technology.

Also, in FIGS. 3 to 5, forms are illustrated in which the protrusion 101b is provided at the edge portion of the opening on the vehicle outer side of the tire house 101, but in FIG. 6, a form is illustrated in which the protrusion 101b is provided within the tire housing 101. When the protrusion 101b is provided within the tire house 101, the range over which the protrusion 101b is provided may be the range from the edge of the tire cross-sectional width S that corresponds to the vehicle inner side of the pneumatic tire 1 to the vehicle outer side, when the pneumatic tire 1 is fitted to the vehicle 100, and the rotational axis P of the pneumatic tire 1 is disposed so that the vehicle 100 can move forward. Also, preferably the protrusion 101b is disposed at the edge of the opening of the vehicle outer side of the tire house 101.

The protrusion 101b provided in this manner is provided within the range from the edge of the tire cross-sectional with S that corresponds to the vehicle inner side of the pneumatic tire 1 to the vehicle outer side, and if the shortest distance from the projecting tip of the protrusion 101b to the rotational axis P is O, and the maximum value of the shortest distance from the inner wall surface 101a of the tire house 101 to the rotational axis P is L, the relationship O<P is satisfied.

Here, the tire cross-sectional width S is the largest total tire width in the tire width direction from which any patterns or characters or the like have been deducted, when the pneumatic tire 1 is assembled onto a regular rim, and inflated with the regular inner pressure, and under no load conditions. In tires provided with a rim protection bar (provided along the tire circumferential direction and projecting to the outer side in the tire width direction) that protects the rim, the rim protection bar is the largest portion in the tire width direction, but the cross-sectional width S as defined in this embodiment excludes the rim protection bar.

Here, "regular rim" refers to a "standard rim" defined by the Japan Automobile Tyre Manufacturers Association Inc. (JATMA), "Design Rim" defined by the Tire and Rim Association, Inc. (TRA), or "Measuring Rim" defined by the European Tyre and Rim Technical Organisation (ETRTO). The "regular inner pressure" refers to "maximum air pressure" defined by JATMA, a maximum value in "tire load limits at various cold inflation pressures" defined by TRA, or "inflation pressures" defined by ETRTO. Note that "regular load" refers to "maximum load capacity" defined by JATMA, a maximum value in "tire load limits at various cold inflation pressures" defined by TRA, and "load capacity" defined by ETRTO.

Figure 7:
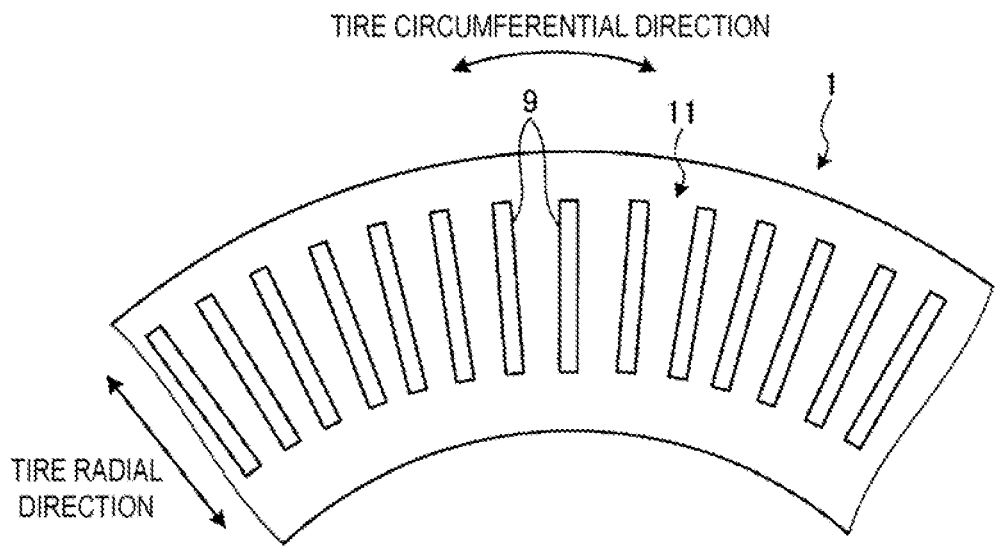
FIG. 7 is a schematic side view illustrating a pneumatic tire of the vehicle air resistance reduction structure according to an embodiment of the present technology.
Figure 8:
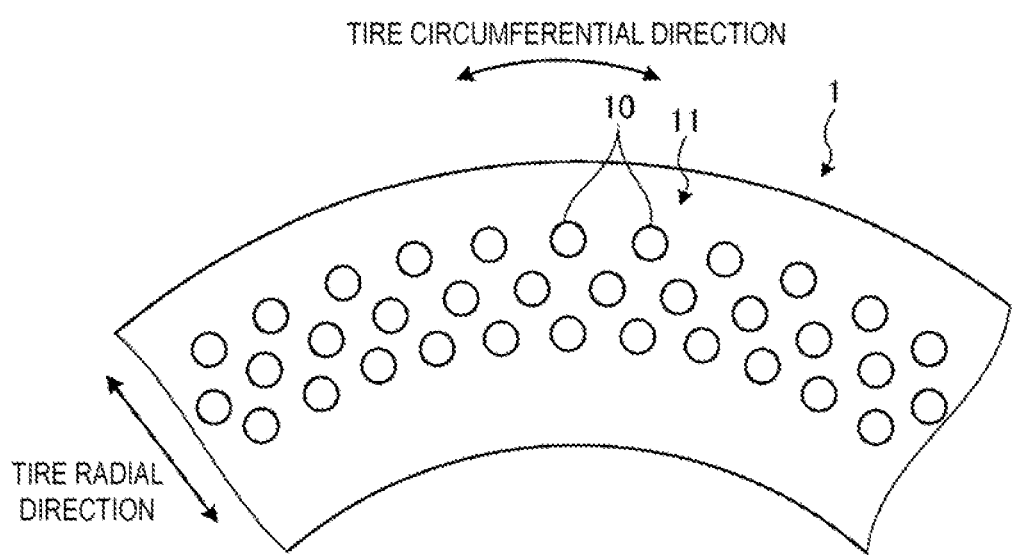
FIG. 8 is a schematic side view illustrating a pneumatic tire of the vehicle air resistance reduction structure according to an embodiment of the present technology.
Figure 9:
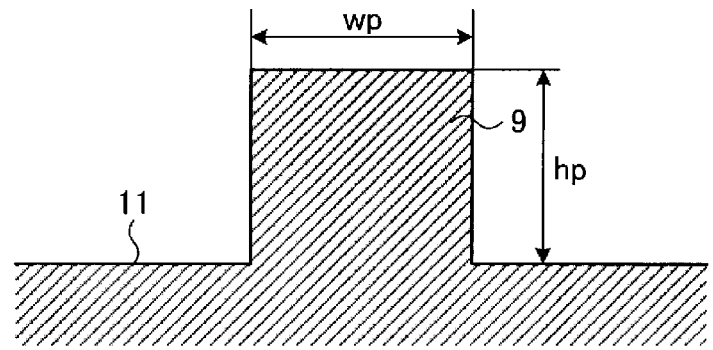
FIG. 9 is a cross-sectional view in the lateral direction of a ridge.
Figure 10:
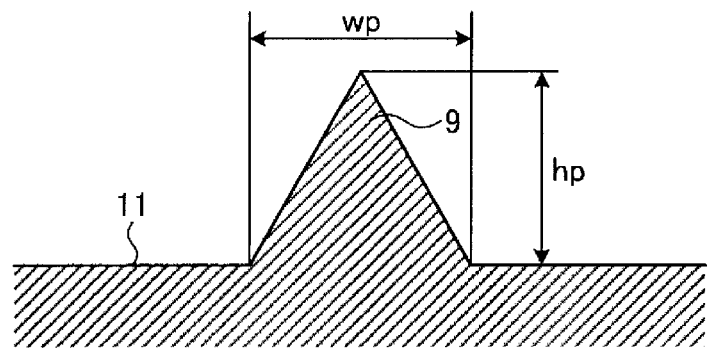
FIG. 10 is a cross-sectional view in the lateral direction of a ridge.
Figure 11:
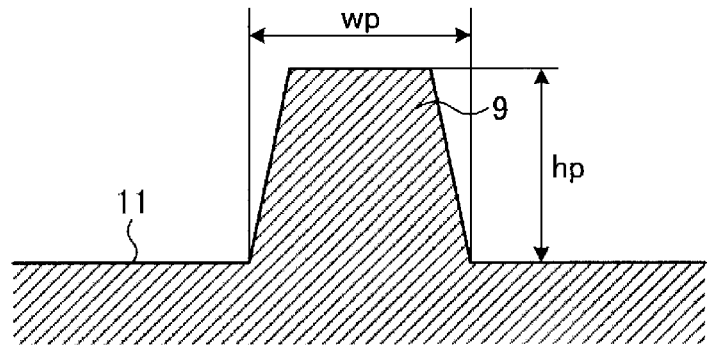
FIG. 11 is a cross-sectional view in the lateral direction of a ridge.
Figure 12:
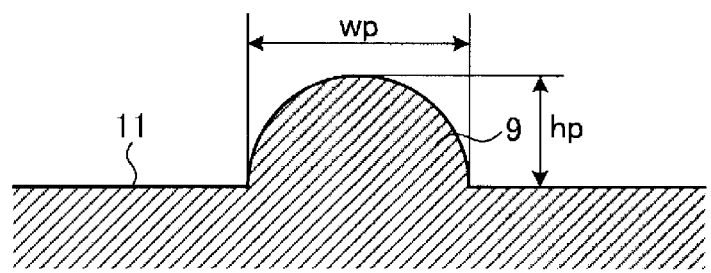
FIG. 12 is a cross-sectional view in the lateral direction of a ridge.

FIG. 7 and FIG. 8 are schematic side views illustrating a pneumatic tire of the vehicle air resistance reduction structure according to an embodiment of the present technology. Regarding the configuration of the pneumatic tire 1 as described above, in the vehicle air resistance reduction structure according to the present embodiment, as illustrated in FIG. 7, in the tire side section 11 of the pneumatic tire 1, a plurality of ridges 9 projecting from the surface of the tire side section 11 to the outer side of the tire is provided. Also, as illustrated in FIG. 8, in the tire side section 11 of the pneumatic tire 1, a plurality of recesses 10 recessed from the surface of the tire side section 11 toward the inner side of the tire is provided.

Here, the "tire side section 11" refers to, with reference to FIG. 2, the surface that continues in the range to the outer side in the tire radial direction from a rim check line R to the outer side in the tire width direction from the ground contact edge T of the tread portion 2. Additionally, the "ground contact edge T" refers to both outermost edges in the tire width direction of a region in which the tread surface 21 of the tread portion 2 of the pneumatic tire 1 contacts the road surface when the pneumatic tire 1 is assembled on a regular rim and filled with regular inner pressure, and 70% of the regular load is applied. The ground contact edge T continues in the tire circumferential direction. Moreover, the "rim check line R" refers to a line used to confirm whether the tire has been assembled on the rim correctly and, typically, is an annular convex line closer to the outer side in the tire radial direction than a rim flange and continues in the tire circumferential direction along a portion approximate to the rim flange on a front side surface of the bead portions 5.

The ridges 9 are formed as ridges that extend longitudinally from the inner side to the outer side in the tire radial direction within the tire side section 11 and are constituted by a rubber material (which may be the rubber material constituting the tire side section 11 or a different rubber material), and a plurality thereof are disposed at predetermined intervals in the tire circumferential direction. Also, tires provided with a rim protection bar include configurations in which the end portions of the ridges 9 on the inner side in the tire radial direction do not reach the rim protection bar, configurations in which the end portions of the ridges 9 on the inner side in the tire radial direction reach the projection of the rim protection bar at mid height, and configurations in which the end portions of the ridges 9 on the inner side in the tire radial direction reach the top of the rim protection bar. In FIG. 7, the ridges 9 are formed extending longitudinally from the inner side to the outer side in the tire radial direction including the maximum tire width position within the range of the tire side section 11. The maximum tire width position is the position of the edges of the tire cross-sectional width S where the width in the tire width direction is largest. Also, although not illustrated on the drawings, the ridges 9 may be divided in the tire radial direction.

Figure 13:
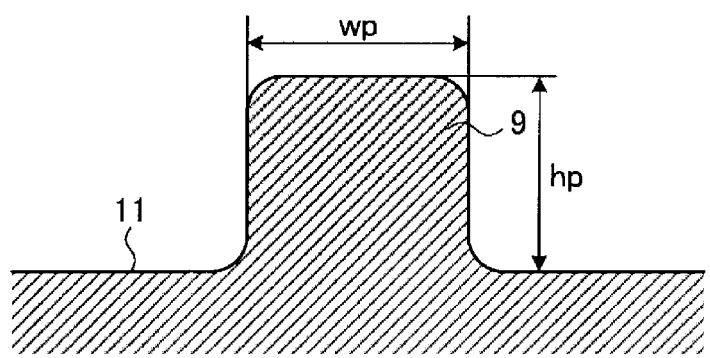
FIG. 13 is a cross-sectional view in the lateral direction of a ridge.
Figure 14:
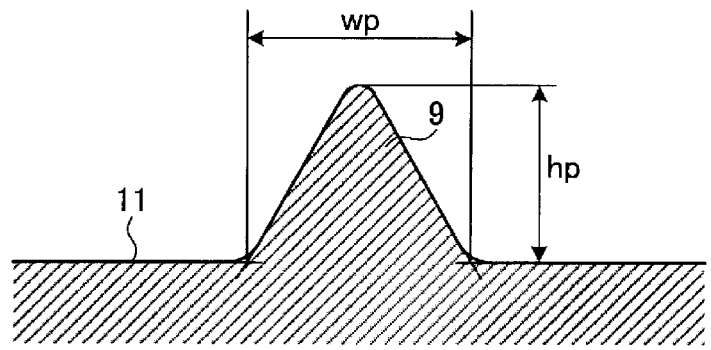
FIG. 14 is a cross-sectional view in the lateral direction of a ridge.
Figure 15:
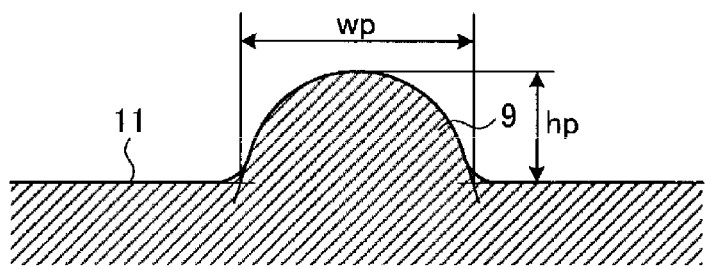
FIG. 15 is a cross-sectional view in the lateral direction of a ridge.

The ridges 9 are formed so that, for example, the cross-sectional shape thereof in the lateral direction has the cross-sectional shape in the lateral direction of the ridges illustrated in FIGS. 9 to 15. The ridge 9 illustrated in FIG. 9 has a cross-sectional shape in the lateral direction that is a rectangular shape. The ridge 9 illustrated in FIG. 10 has a cross-sectional shape in the lateral direction that is a triangular shape. The ridge 9 illustrated in FIG. 11 has a cross-sectional shape in the lateral direction that is a trapezoidal shape. In addition, while not illustrated in the drawings, the cross-sectional shape in the lateral direction of the ridges 9 may be various shapes such as a triangular shape on the top of rectangular shape, or a zigzag shape on the top of rectangular shape. Also, the cross-sectional shape in the lateral direction of the ridges 9 may have an external form based on curved lines. The ridge 9 illustrated in FIG. 12 has a cross-sectional shape in the lateral direction that is a semi-circular shape. In addition, while not illustrated in the drawings, the cross-sectional shape in the lateral direction of the ridges 9 may have various shapes such as, for example, a semi-oval shape or a semi-elliptical shape. Also, the cross-sectional shape in the lateral direction of the ridges 9 may have an external form that is a combination of straight lines and curves. The ridge 9 illustrated in FIG. 13 has a cross-sectional shape in the lateral direction that is a rectangular shape with curved corners. The ridge 9 illustrated in FIG. 14 has a cross-sectional shape in the lateral direction that is a triangular shape with curved corners. In addition, while not illustrated in the drawings, the shape may be various shapes such as a waveform on the top of rectangular shape. Also, as illustrated in FIGS. 13 to 15, the cross-sectional shape in the lateral direction of the ridges 9 may have a shape in which the base portion that projects from the tire side section 11 is curved. Also, the ridges 9 may be formed with a uniform cross-sectional shape in the longitudinal direction (projection height from the tire side section 11 or width in the lateral direction), or may be formed with a cross-sectional shape in the longitudinal direction that varies.

As illustrated in FIG. 8, the recesses 10 are disposed, for example, within the tire side section 11 at predetermined intervals in the tire radial direction and the tire circumferential direction.

The recesses 10 have an aperture shape that is open on the surface of the tire side section 11, and are formed in a circular shape, an elliptical shape, an oval shape, a polygonal shape, or the like. Also, the recesses 10 are formed so that the cross-sectional shape is a semi-circular shape, a semi-oval shape, a semi-elliptical shape, a mortar shape, a rectangular shape, or the like. In FIG. 3, the recesses 10 are disposed in a staggered manner in the tire radial direction and the tire circumferential direction, but may be disposed in a line in the tire radial direction, or disposed in a line in the tire circumferential direction.

Figure 16:
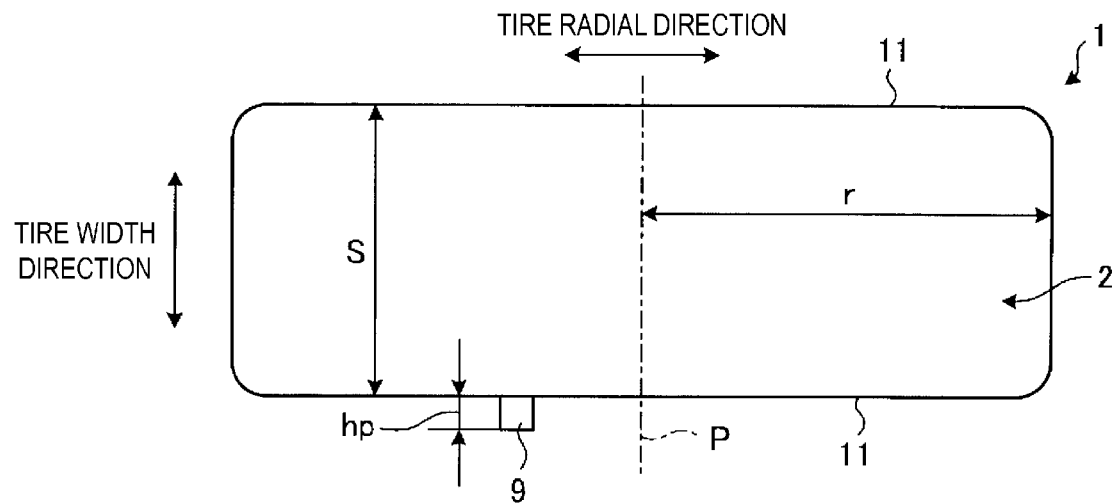
FIG. 16 is a plan view illustrating an arrangement of ridges.
Figure 17:
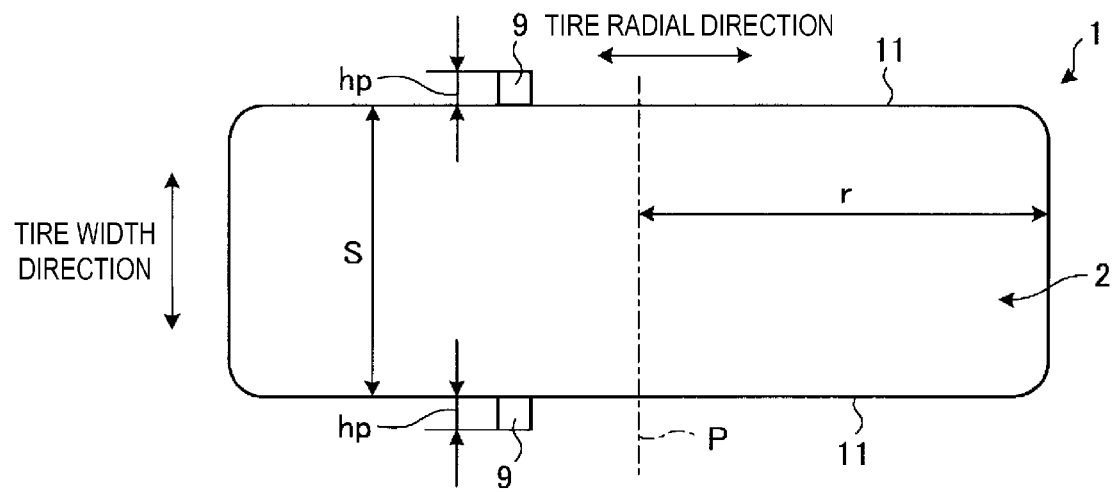
FIG. 17 is a plan view illustrating an arrangement of ridges.
Figure 18:
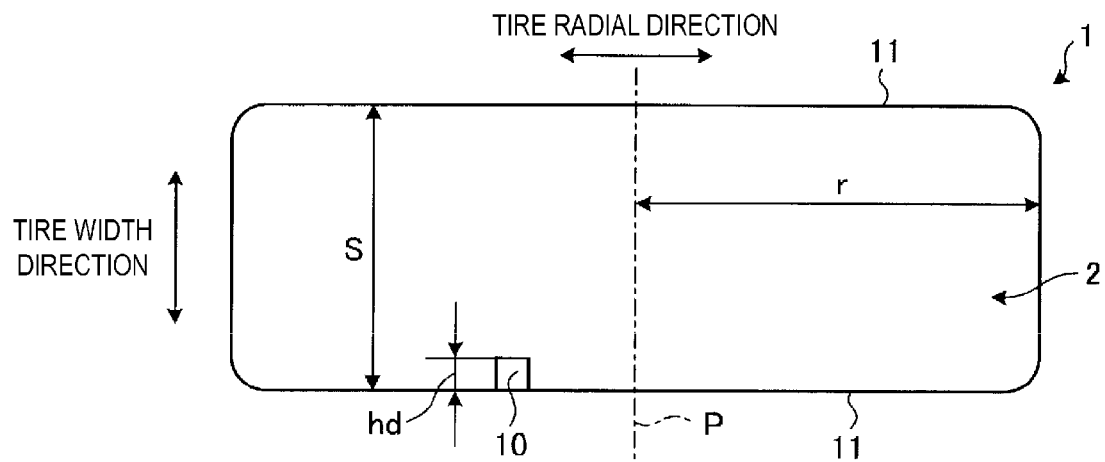
FIG. 18 is a plan view illustrating an arrangement of recesses.
Figure 19:
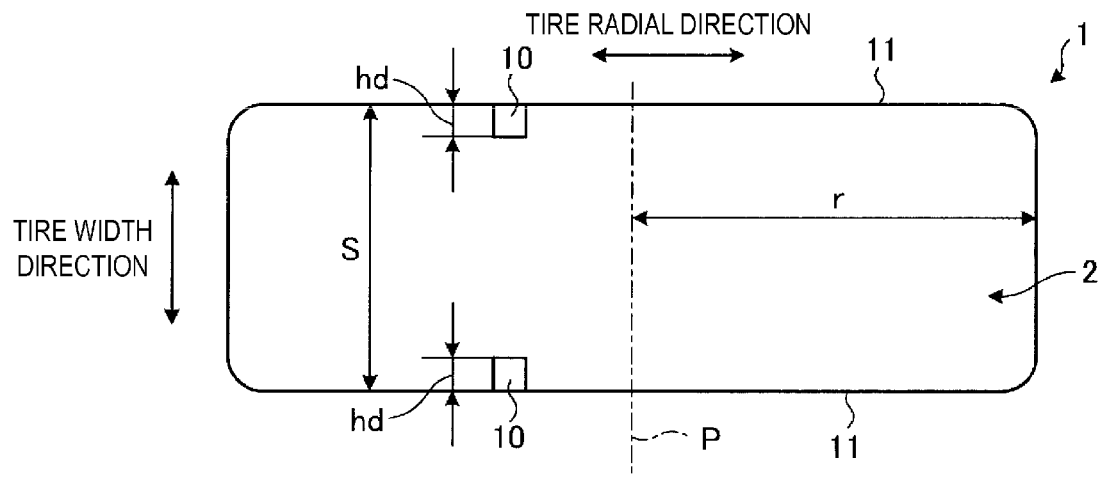
FIG. 19 is a plan view illustrating an arrangement of recesses.
Figure 20:
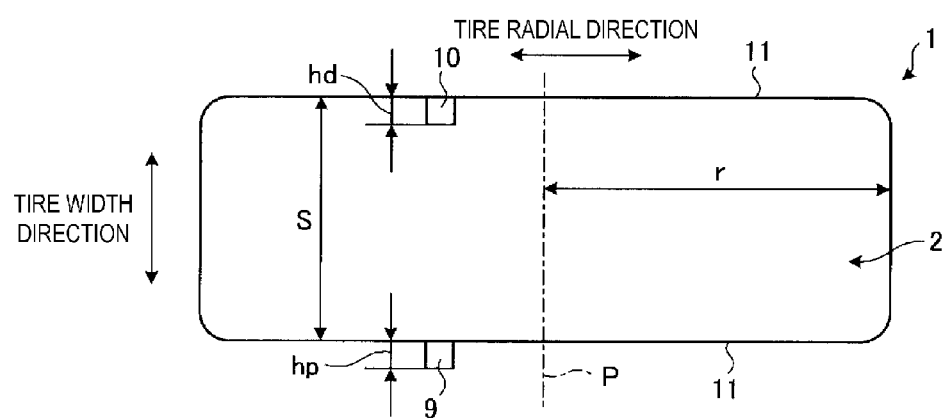
FIG. 20 is a plan view illustrating an arrangement of ridges and recesses.

The ridges 9 and the recesses 10 are provided on the tire side section 11 with the ridges disposed as in the plan views of FIG. 16 or 17, with the recesses disposed as in the plan views of FIGS. 18 and 19, and with the ridges and recesses disposed as in the plan view of FIG. 20. The ridges 9 illustrated in FIG. 16 are provided on the tire side section 11 on one side of the pneumatic tire 1. The ridges 9 illustrated in FIG. 17 are provided on the tire side section 11 on both sides of the pneumatic tire 1. The recesses 10 illustrated in FIG. 18 are provided on the tire side section 11 on one side of the pneumatic tire 1. The recesses 10 illustrated in FIG. 19 are provided on the tire side section 11 on both sides of the pneumatic tire 1. The ridges 9 and the recesses 10 illustrated in FIG. 20 are each provided on one tire side section 11 of the pneumatic tire 1. Note that, although not illustrated on the drawings, the ridges 9 and the recesses 10 may be provided mixed on the tire side section 11 of the pneumatic tire 1.

Also, as illustrated in FIGS. 16, 17, and 20, in the ridges 9, if the maximum distance from the surface of the tire side section 11 is Hp, then the ratio between Hp and the tire cross-sectional width S of the pneumatic tire 1 satisfies $0.005 \leq Hp/S \leq 0.05$. The maximum distance Hp is the sum of the maximum height hp of the ridges 9 from the surface of the tire side section 11 in the case that the ridges 9 are on the tire side sections 11 on both sides, as illustrated in FIG. 17. Also, as illustrated in FIGS. 18 to 20, in the recesses 10, if the maximum distance from the surface of the tire side section 11 is Hd, then the ratio between Hd and the tire cross-sectional width S of the pneumatic tire 1 satisfies $0.001 \leq Hd/S \leq 0.01$. The maximum distance Hd is the sum of the maximum depths hd of the recesses 10 from the surface of the tire side section 11 in the case that the recesses 10 are on the tire side sections 11 on both sides, as illustrated in FIG. 19.

In this manner, the vehicle air resistance reduction structure according to the present embodiment includes the tire house 101 of the vehicle 100, and the pneumatic tire 1 disposed within the tire house 101. In the state in which the pneumatic tire 1 is mounted on the vehicle 100 with the rotational axis P of the pneumatic tire 1 disposed so that the vehicle 100 can move forward, the protrusion 101b that projects from the inner wall surface 101a of the tire house 101 towards the rotational axis P side is provided in the region of the pneumatic tire 1 from the edge of the tire cross-sectional width S that corresponds to the vehicle inner side of the pneumatic tire 1 to the vehicle outer side, and on the pneumatic tire 1 side, a plurality of ridges 9 and/or recesses 10 is provided on at least one of the tire side sections 11, and when the maximum distance of the ridge 9 from the surface of the tire side section 11 is Hp, the maximum distance of the recess 10 from the surface of the tire side section 11 is Hd, and the tire cross-sectional width of the pneumatic tire 1 is S, the range $0.005 \leq Hp/S \leq 0.05$ and/or the range $0.001 \leq Hd/S \leq 0.01$ is satisfied.

Figure 21:
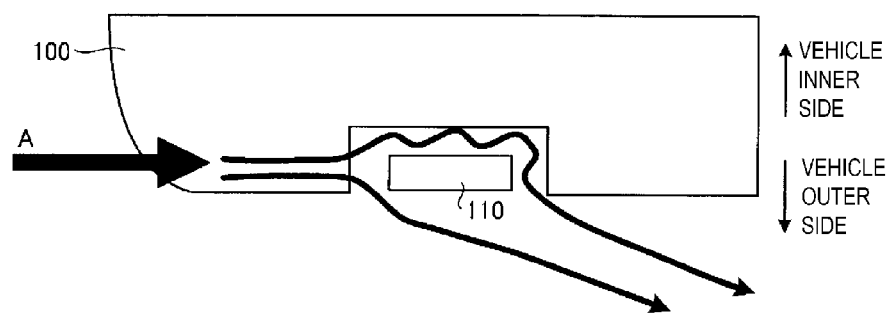
FIG. 21 is an explanatory view illustrating the flow of air in the vicinity of a typical pneumatic tire.
Figure 22:
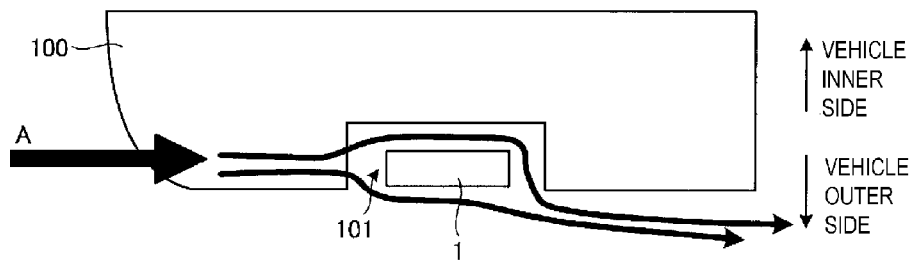
FIG. 22 is an explanatory view illustrating the flow of air in the vehicle air resistance reduction structure according to an embodiment of the present technology.

FIG. 21 is an explanatory view illustrating the flow of air in the vicinity of a typical pneumatic tire, and FIG. 22 is an explanatory view illustrating the flow of air in the vehicle air resistance reduction structure according to an embodiment of the present technology. As illustrated in FIG. 21, when a typical pneumatic tire 110 that does not have ridges 9 or recesses 10 is fitted to the vehicle 100, a flow of air from the leading side to the trailing side of the vehicle as indicated by the arrow symbol A in the drawing is produced by the vehicle 100 traveling. The flow of air A passes between the pneumatic tire 110 and the vehicle 100 on the vehicle inner side of the pneumatic tire 110 and exits spreading on the vehicle outer side. Also, on the vehicle outer side of the pneumatic tire 110, the air flow passes while spreading to the vehicle outer side. These air flows cause vehicle resistance.

In contrast, according to the vehicle air resistance reduction structure of the present embodiment, ridges 9 satisfying the range $0.005 \leq Hp/S \leq 0.05$ or recesses 10 satisfying the range $0.001 \leq Hd/S \leq 0.01$ are provided on the tire side section 11 of the pneumatic tire 1, and the protrusion 101b projecting from the inner wall surface 101a of the tire house 101 is provided, so an air flow distribution promotion effect and straightening effect is produced by the ridges 9 on the flow of air A from the leading side to the trailing side of the vehicle 100. Also, the flow of air A from the leading side to the trailing side of the vehicle 100 is made turbulent by the recesses 10, so the drag tending to pull to the rear caused by the low pressure produced to the rear of the pneumatic tire 1 during driving is reduced. In addition, as a result of the protrusion 101b of the tire house 101, the flow of air on the vehicle inner side of the protrusion 101b is suppressed from flowing out to the vehicle outer side, and by enclosing the air within the tire house 101, the air flow distribution promotion effect and straightening effect due to the ridges 9 and the turbulence of the air due to the recesses 10 is assisted. Therefore, a turbulent flow boundary layer is generated on the periphery of the pneumatic tire 1, so as illustrated in FIG. 22, on the vehicle inner side, expansion of air that escapes to the vehicle outer side to the rear of the vehicle is suppressed, and, on the vehicle outer side, expansion of the air passing the vehicle outer side of the pneumatic tire 1 is suppressed. As a result, the spread of the passing air is suppressed, so the air resistance of the vehicle 100 is reduced. In this manner, the fuel economy of the vehicle 100 can be improved.

Also, in the vehicle air resistance reduction structure according to the present embodiment, in the range from the edge of the tire cross-sectional width S that corresponds to the vehicle inner side of the pneumatic tire 1 to the vehicle outer side, when the shortest distance from the projecting tip of the protrusion 101b to the rotational axis P is O, the maximum value of the shortest distance from the inner wall surface 101a of the tire house 101 to the rotational axis P is L, and the tire radius is r, preferably the range $0.01 \leq (L-O)/r \leq 0.5$ is satisfied.

Here, the tire radius r refers to the distance from the rotational axis P of the pneumatic tire 1 to the maximum dimension in the tire radial direction. By making $(L-O)/r$ not less than 0.01, the heights of projection of the protrusions 101b from the inner wall surface 101a is sufficient, and the flow of air on the vehicle inner side is prevented from flowing out towards the vehicle outer side by the protrusions 101b. Also by enclosing the air within the tire house 101, the air flow distribution promotion effect and straightening effect due to the ridges 9 is assisted and the turbulence of the air due to the recesses 10 is assisted and a more significant effect can be obtained. On the other hand, by making $(L-O)/r$ not more than 0.5, the protrusion 101b is prevented from projecting too much from the inner wall surface 101a, and it is possible to prevent the protrusion 101b from interfering with the flow of air. In other words, when $(L-O)/r$ is greater than 0.5, the effect of enclosing the air within the tire house 101 tends to be excessive, and stagnation in the flow of air can easily occur in the space on the vehicle inner side of the protrusion 101b. Therefore there is a possibility that the air flow distribution promotion effect and straightening effect due to the ridges 9 and the effect of the turbulence of the air due to the recesses 10 will be reduced.

Also, in the vehicle air resistance reduction structure according to the present embodiment, the plurality of ridges 9 provided on the pneumatic tire 1 extend longitudinally from the inner side to the outer side in the tire radial direction, and is disposed at intervals in the tire circumferential direction, and if the height of projection from the surface of the tire side section 11 is hp, the width in the lateral direction is wp, and the number of ridges 9 on one tire side section 11 is Np, preferably the range $5 \leq Np \cdot hp/wp \leq 200$ is satisfied.

If the projection height hp of the ridges 9 is too small relative to the width wp in the lateral direction, the projection height hp of the ridges 9 tends to be too low, and the range of the ridges 9 in contact with the flow of air is small, so it is difficult to obtain a more significant air flow distribution promotion effect and straightening effect due to the ridges 9. On the other hand, if the projection height hp of the ridges 9 is too large relative to the width wp in the lateral direction, the projection height hp of the ridges 9 tends to be too high, and the range of the ridges 9 in contact with the flow of air is large, so the ridges 9 provide air resistance, and the air flow distribution promotion effect and straightening effect due to the ridges 9 is reduced. Also, if the number Np of ridges 9 is too small relative to the width wp in the lateral direction, the range of the ridges 9 in contact with the flow of air is small, so it is difficult to obtain a more significant air flow distribution promotion effect and straightening effect due to the ridges 9. On the other hand, if the number Np of the ridges 9 is too large relative to the width wp in the lateral direction, the range of the ridges 9 in contact with the flow of air is large, so the ridges 9 provide air resistance, and the air flow distribution promotion effect and straightening effect due to the ridges 9 is reduced. Therefore, by making the relationship between the projection height hp of the ridges 9, the width wp of the ridges 9 in the lateral direction, and the number Np of the ridges 9 on one tire side section 11 appropriate, it is possible to obtain a significant air flow distribution promotion effect and straightening effect due to the ridges 9.

Also, in the vehicle air resistance reduction structure according to the present embodiment, in the case of the recesses 10 provided on the pneumatic tire 1, when the depth of the recess from the surface of the tire side section 11 is hd, the diameter dimension of the opening is wd, and the number on one tire side section 11 is Nd, preferably the range $1 \leq Nd \cdot hd/wd \leq 10000$ is satisfied.

When the depth hd of the recesses 10 is too small relative to the diameter dimension wd, the depth hd of the recesses 10 tends to be too shallow, and the effect of turbulence in the air due to the recesses 10 is reduced. On the other hand, when the depth hd of the recesses 10 is too large relative to the diameter dimension wd, the depth hd of the recesses 10 tends to be too deep, and there is a possibility that the difference in height at the recesses 10 will cause air resistance. Also, when the number Nd of the recesses 10 is too small relative to the diameter dimension wd, the range of the recesses 10 in contact with the flow of air is small, so the effect of turbulence in the air due to the recesses 10 is reduced. On the other hand, when the number Nd of the recesses 10 is too large relative to the diameter dimension wd, the range of the recesses 10 in contact with the flow of air is large, so there is a possibility that the recesses 10 will cause air resistance. Therefore, by making the relationship between the depth hd of the recesses 10, the diameter dimension wd of the opening of the recesses 10, and the number Nd of the recesses 10 on one tire side section 11 appropriate, a significant effect of turbulence of the air due to the recesses 10 can be obtained.

Also, in the vehicle air resistance reduction structure according to the present embodiment, preferably the height of projection hp of the ridges 9 provided on the pneumatic tire 1 from the surface of the tire side section 11 satisfies the range of not less than 1 mm and not more than 10 mm.

If the projection height hp of the ridges 9 is less than 1 mm, it is difficult to obtain a significant air flow distribution promotion effect and straightening effect due to the ridges 9. On the other hand, if the projection height hp of the ridges 9 exceeds 10 mm, the range over which the ridges 9 contact the air flow will be large, so the ridges 9 will increase the air resistance and the air flow distribution promotion effect and the straightening effect will be small. Therefore, by making the projection height hp of the ridges 9 not less than 1 mm and not more than 10 mm, a significant air flow distribution promotion effect and straightening effect due to the ridges 9 can be obtained.

Note that preferably the projection height hp of the ridges 9 from the surface of the tire side section 11 satisfies the range of not less than 1 mm and not more than 10 mm, the number Np on one tire side section 11 satisfies the range not less than 10 and not more than 50, and the width wp in the lateral direction satisfies the range not less than 0.5 mm and not more than 5 mm.

When the number Np of ridges 9 is less than 10, it is difficult to obtain the air flow distribution promotion effect and the straightening effect. On the other hand, when the number of ridges 9 exceeds 50, the ridges 9 will increase the air resistance and the air flow distribution promotion effect and the straightening effect becomes smaller, the tire mass increases, and the rolling resistance tends to increase. Therefore, preferably, the number Np of ridges 9 is in the range of not less than 10 and not more than 50. In addition, when the width wp of the ridges 9 is less than 0.5 mm, the ridges 9 can easily deform and it becomes difficult to obtain the air flow distribution promotion effect and the straightening effect. On the other hand, when the width wp of the ridges 9 exceeds 5 mm, the ridges 9 will increase the air resistance and the air flow distribution promotion effect and the straightening effect become smaller, the tire mass increases, and the rolling resistance tends to increase. Therefore, preferably, the width wp of the ridges 9 is in the range of not less than 0.5 mm and not more than 5 mm.

Also, in the vehicle air resistance reduction structure according to the present embodiment, preferably the depth hd of the recesses 10 provided on the pneumatic tire 1 from the surface of the tire side section 11 satisfies the range of not less than 0.3 mm and not more than 2 mm.

When the depth hd of the recesses 10 is less than 0.3 mm, the effect of turbulence of the air due to the recesses 10 is reduced. On the other hand, when the depth hd of the recesses 10 exceeds 2 mm, there is a possibility that the difference in height at the recesses 10 will cause air resistance. Therefore, by making the depth hd of the recesses 10 within the range of not less than 0.3 mm and not more than 2 mm, a significant effect of turbulence of the air due to the recesses 10 can be obtained.

Note that preferably the depth hd of the recesses 10 satisfies the range not less than 0.3 mm and not more than 2 mm, and the diameter dimension wd of the opening satisfies the range not less than 0.5 mm and not more than 10 mm.

If the diameter dimension of the opening of the recesses 10 is not less than 0.5 mm and the depth is not less than 0.3 mm, sufficient turbulent flow generation effect can be obtained. On the other hand, if the diameter dimension of the opening portion of the recesses 10 is not more than 10 mm and the depth is not more than 2 mm, it is possible to obtain a turbulent flow generation effect without increasing the air resistance.

Also, in the vehicle air resistance reduction structure according to the present embodiment, preferably the ridges 9 provided on the pneumatic tire 1 are disposed on the tire side section 11 that corresponds to the vehicle inner side when the pneumatic tire 1 is fitted to the vehicle 100.

Here, in cases where the pneumatic tire 1 is mounted on the vehicle 100, orientations with respect to the inner side and the outer side in the tire width direction of the vehicle are designated. The orientation designations, while not illustrated in the drawings, for example, can be shown via indicators provided on the sidewall portions 4. Therefore, the side facing the inner side of the vehicle 100 when mounted on the vehicle 100 is the "vehicle inner side", and the side facing the outer side of the vehicle 100 is the "vehicle outer side". Note that the designations of the vehicle inner side and the vehicle outer side are not limited to cases when mounted on the vehicle 100. For example, in cases when assembled on a rim, orientation of the rim with respect to the inner side and the outer side of the vehicle 100 in the tire width direction is set. Therefore, in cases when the pneumatic tire 1 is assembled on a rim, the orientation with respect to the vehicle inner side and the vehicle outer side in the tire width direction is designated.

By disposing the ridges 9 on the tire side section 11 corresponding to the vehicle inner side of the pneumatic tire 1 mounted on the vehicle 100, it is possible to obtain a significant reduction in the expansion of the air passing through the vehicle outer side at the rear of the vehicle due to the air flow distribution promotion effect and straightening effect due to the ridges 9 on the flow of air passing from the vehicle leading side to the vehicle trailing side between the pneumatic tire 1 and the vehicle 100.

Also, in the vehicle air resistance reduction structure according to the present embodiment, preferably the recesses 10 provided on the pneumatic tire 1 are disposed on the tire side section 11 that corresponds to the vehicle outer side when the pneumatic tire 1 is mounted on the vehicle 100.

By disposing the recesses 10 on the tire side section 11 corresponding to the vehicle outer side of the pneumatic tire 1 mounted on the vehicle 100, it is possible to obtain a significant reduction in the expansion of the air passing the vehicle outer side of the pneumatic tire 1 due to the effect of the air turbulence caused by the recesses 10 on the flow of air passing on the vehicle outer side of the pneumatic tire 1 from the vehicle leading side to the vehicle trailing side.

Also, in the vehicle air resistance reduction structure according to the present embodiment, the orientation of the pneumatic tire 1 with respect to the vehicle inner side and outer side when mounted on the vehicle is designated, and preferably the ridges 9 as described above are disposed on the tire side section 11 corresponding to the vehicle inner side, and the recesses 10 are disposed on the tire side section 11 corresponding to the vehicle outer side.

In this case, the flow of air from the leading side to the trailing side of the vehicle 100 is promoted and straightened by the ridges 9 on the vehicle inner side of the pneumatic tire 1. Therefore, turbulence of the air flow passing the vehicle inner side of the pneumatic tire 1 is suppressed. On the other hand, the flow of air from the leading side to the trailing side of the vehicle 100 is made turbulent by the recesses 10 on the vehicle outer side of the pneumatic tire 1, so a turbulent flow boundary layer is generated around the periphery of the pneumatic tire 1, and separation from the pneumatic tire 1 is suppressed. Therefore, spreading of the air flow passing the vehicle outer side of the pneumatic tire 1 is suppressed. As a result, the spread of the passing air is suppressed, so the air resistance of the vehicle 100 is further reduced, and it is possible to further improve the fuel economy of the vehicle 100.

Also, the vehicle 100 according to the present embodiment includes the tire house 101, and the vehicle air resistance reduction structure as described above is applied to the vehicle 100 with the pneumatic tires 1 disposed within the tire houses 101.

According to this vehicle 100, the air flow distribution promotion effect and straightening effect due to the ridges 9 of the pneumatic tire 1 are produced on the flow of air from the leading side to the trailing side of the vehicle 100. Also, the flow of air from the leading side to the trailing side of the vehicle 100 is made turbulent by the recesses 10 of the pneumatic tire 1, so the drag tending to pull to the rear caused by the low pressure produced to the rear of the pneumatic tire 1 during driving is reduced. In addition, as a result of the protrusion 101b of the tire house 101, the flow of air on the vehicle inner side of the protrusion 101b is suppressed from flowing out in the vehicle outer side, and by enclosing the air within the tire house 101, the air flow distribution promotion effect and straightening effect due to the ridges 9 and the turbulence of the air due to the recesses 10 is assisted. Therefore, a turbulent flow boundary layer is generated on the periphery of the pneumatic tire 1, so as illustrated in FIG. 22, on the vehicle inner side, expansion of air that escapes the vehicle outer side to the rear of the vehicle is suppressed, and, on the vehicle outer side, expansion of the air passing the vehicle outer side of the pneumatic tire 1 is suppressed. As a result, the spread of the passing air is suppressed, so the air resistance of the vehicle 100 can be reduced. In this manner, the fuel economy of the vehicle 100 can be improved.

The following is a description of a modified example of the ridges 9 provided in the pneumatic tire 1. FIGS. 23 to 34 are schematic side views illustrating modified examples of ridges on a pneumatic tire of the vehicle air resistance reduction structure according to the present embodiment.

As illustrated in FIGS. 23 to 34, the ridges 9 extend longitudinally from the inner side to the outer side in the tire radial direction including the tire maximum width position S', and the extension directions are disposed at an inclination with respect to the tire radial direction. Also, each of the ridges 9 adjacent to each other in the tire circumferential direction is disposed with the opposite orientation of the inclination with respect to the tire radial direction.

Figure 23:
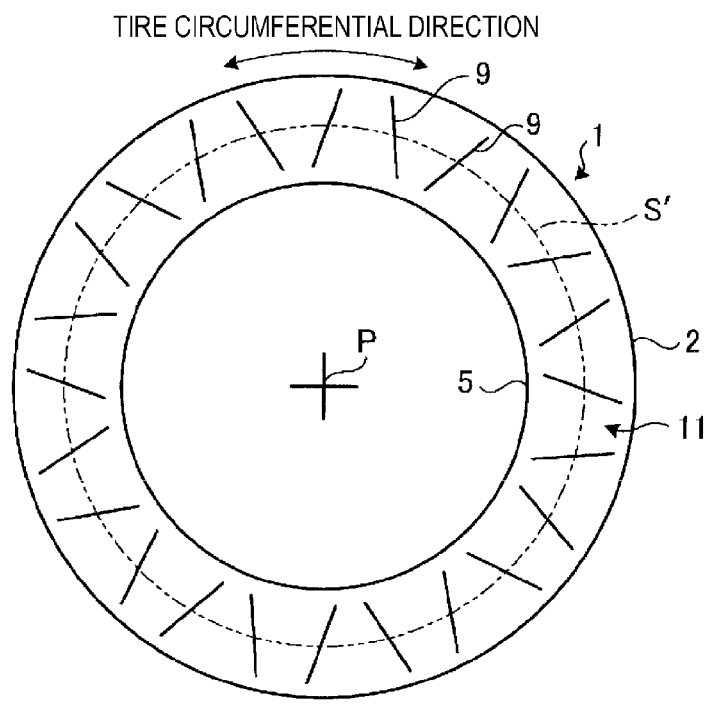
FIG. 23 is a schematic side view illustrating a modified example of ridges on a pneumatic tire of the vehicle air resistance reduction structure according to an embodiment of the present technology.
Figure 24:
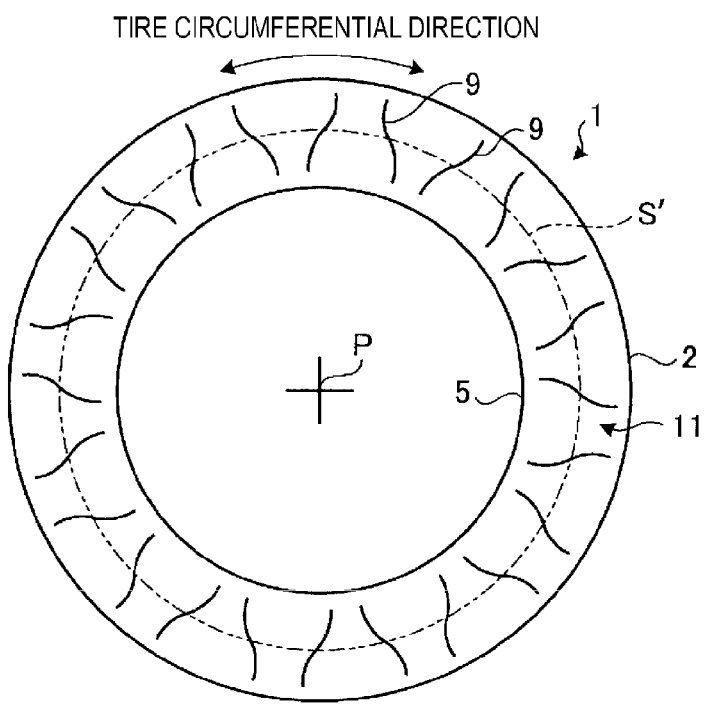
FIG. 24 is a schematic side view illustrating a modified example of ridges on a pneumatic tire of the vehicle air resistance reduction structure according to an embodiment of the present technology.
Figure 25:
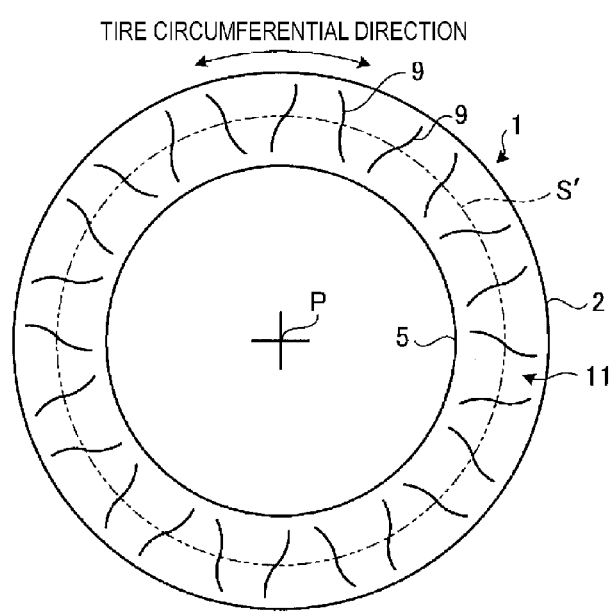
FIG. 25 is a schematic side view illustrating a modified example of ridges on a pneumatic tire of the vehicle air resistance reduction structure according to an embodiment of the present technology.

Specifically, the ridges 9 illustrated in FIG. 23 are formed as straight line ridges in their longitudinal direction, their extension directions (longitudinal direction) are inclined with respect to the tire radial direction, and each of the ridges 9 adjacent to each other in the tire circumferential direction is disposed with the opposite orientation of the inclination with respect to the tire radial direction. Also, the ridges 9 illustrated in FIG. 24 are formed as S-shaped ridges in the longitudinal direction, their extension directions (longitudinal direction) are inclined with respect to the tire radial direction, and each of the ridges 9 adjacent to each other in the tire circumferential direction is disposed with the opposite orientation of the inclination with respect to the tire radial direction. The ridges 9 illustrated in FIG. 24 have symmetrical shapes in which the shape of each of the ridges 9 adjacent to each other in the tire circumferential direction is inverted about the tire radial direction. Also, the ridges 9 illustrated in FIG. 25 are formed as S-shaped ridges in the longitudinal direction, their extension directions (longitudinal direction) are inclined with respect to the tire radial direction, and each of the ridges 9 adjacent to each other in the tire circumferential direction is disposed with the opposite orientation of the inclination with respect to the tire radial direction. The ridges 9 illustrated in FIG. 25 have the same shape and the shape of each of the ridges 9 adjacent to each other in the tire circumferential direction is not inverted about the tire radial direction. In the case of the straight line ridges 9 illustrated in FIG. 23, the extension direction is the direction along the straight line, but in other cases such as the S-shaped ridges 9 as illustrated in FIGS. 24 and 25, or while not illustrated in the drawings, for example, a bent shape such as a Z-shape, a dog-leg shape, or a zigzag shape, or a curved shape such as a C shape or a wavy shape, the extension direction is the direction of a straight line that connects the center in the lateral direction (direction intersecting the longitudinal direction) of the end on the inner side in the tire radial direction and the center in the lateral direction of the end on the outer side in the tire radial direction.

By obtaining an air flow distribution promotion effect and straightening effect at the tire maximum width position S', which is the main factor for increasing the air resistance of the vehicle 100 as a result of the ridges 9 provided in the tire side section 11 including the tire maximum width position S', the air resistance reduction effect of the vehicle 100 on which the pneumatic tire 1 has been mounted is maintained, and the fuel economy of the vehicle 100 can be improved. Moreover, the extension direction of the ridges 9 is inclined with respect to the tire radial direction, and each of the ridges 9 that are adjacent to each other in the tire circumferential direction is disposed with the opposite orientation of the inclination with respect to the tire radial direction, so the stiffness in the tire radial direction due to the ridges 9 is kept to a minimum, and the unevenness of the stiffness in the tire circumferential direction is reduced. Therefore there is no local increase in the stiffness in the tire radial direction along the tire circumferential direction at the ground contact portion that contacts the road surface, so it is possible to improve the uniformity and suppress the occurrence of vibrations during traveling of the pneumatic tire 1.

Also, as illustrated in FIGS. 23 and 24, preferably, each of the ridges 9 adjacent to each other in the tire circumferential direction are disposed to be symmetrical with respect to the tire radial direction.

In this manner, by disposing each of the ridges 9 that are adjacent to each other in the tire circumferential direction to be symmetrical with respect to the tire radial direction, the unevenness of stiffness in the tire circumferential direction due to the ridges 9 is reduced, and a significant effect of improvement in the uniformity of the pneumatic tire 1 can be obtained.

Also, preferably, the angle θ of the ridges 9 with respect to the tire radial direction, with the end on the inner side in the tire radial direction as a reference point, about the tire rotational direction satisfies the range of +1°≤θ≤+60° or −60°≤θ≤−1°.

Figure 26:
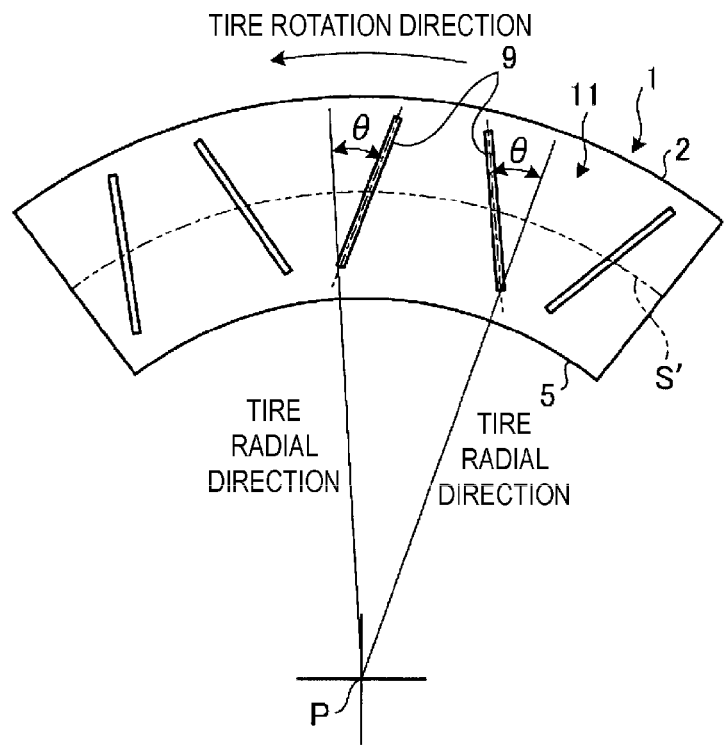
FIG. 26 is a schematic side view illustrating a modified example of ridges on a pneumatic tire of the vehicle air resistance reduction structure according to an embodiment of the present technology.
Figure 27:
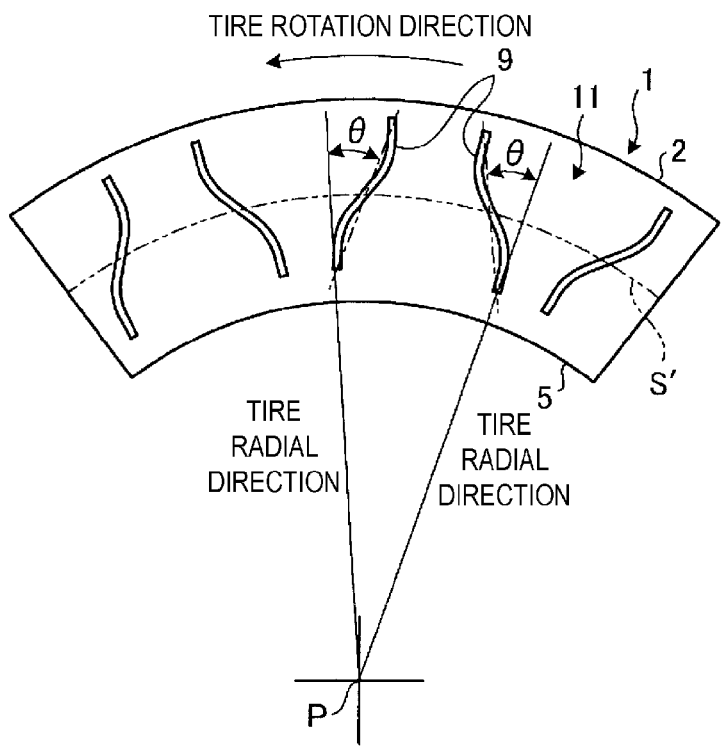
FIG. 27 is a schematic side view illustrating a modified example of ridges on a pneumatic tire of the vehicle air resistance reduction structure according to an embodiment of the present technology.
Figure 28:
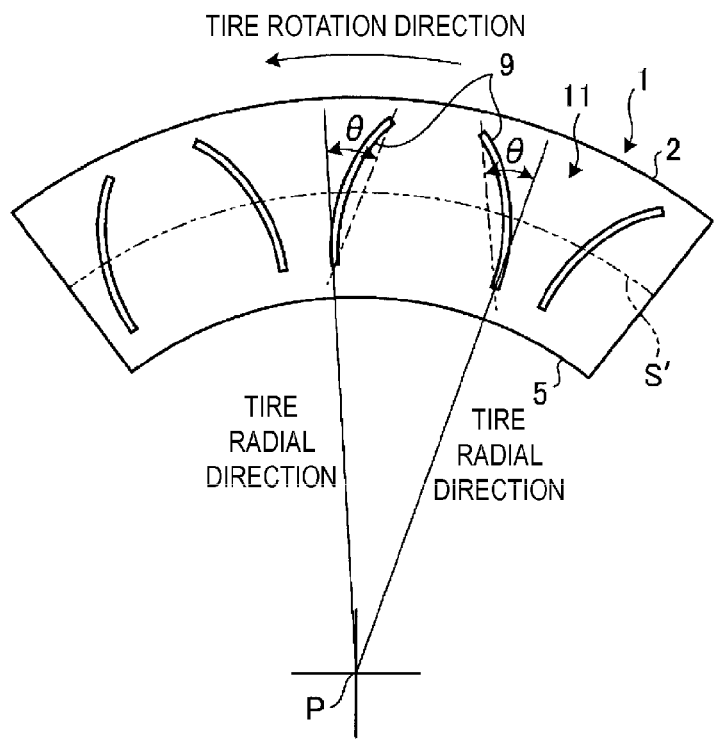
FIG. 28 is a schematic side view illustrating a modified example of ridges on a pneumatic tire of the vehicle air resistance reduction structure according to an embodiment of the present technology.
Figure 29:
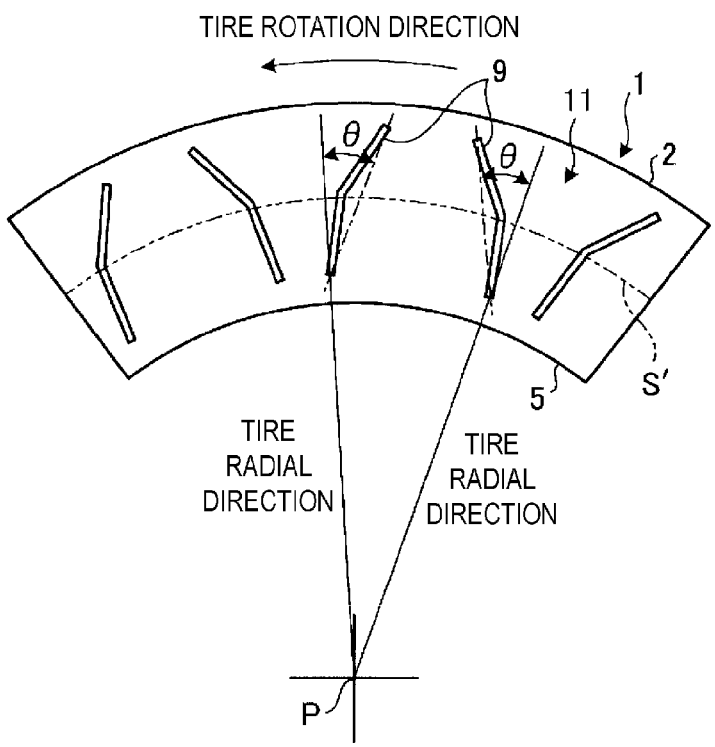
FIG. 29 is a schematic side view illustrating a modified example of ridges on a pneumatic tire of the vehicle air resistance reduction structure according to an embodiment of the present technology.

Specifically, as illustrated in FIG. 26, the extension direction of each of the ridges 9 whose extension direction is a straight line is inclined with respect to the tire radial direction, and each of the ridges 9 adjacent to each other in the tire circumferential direction is disposed with the opposite orientation of the inclination with respect to the tire radial direction. Therefore the angle θ of each of the ridges 9 that are adjacent to each other in the tire circumferential direction with respect to the tire radial direction with the end on the inner side in the tire radial direction as a reference point satisfies the range of +1°≤θ≤+60° with respect to the tire rotational direction for one, and the other satisfies the range of −60°≤θ≤−1°. Also, as stated above, the extension direction of the ridges 9 is the straight line that connects the center in the lateral direction (direction intersecting the longitudinal direction) of the end on the inner side in the tire radial direction and the center in the lateral direction of the end on the outer side in the tire radial direction. Therefore, for example, in the case of a ridge 9 that is curved in an S shape in the extension direction as illustrated in FIG. 27, or a ridge 9 that is curved in a C shape in the extension direction as illustrated in FIG. 28, or a ridge 9 that is bent in a dog-leg shape in the extension direction as illustrated in FIG. 29 also, the extension direction is inclined with respect to the tire radial direction, and each of the ridges 9 that are adjacent to each other in the tire circumferential direction is disposed with the opposite orientation of the inclination with respect to the tire radial direction, and the angle θ of each of the ridges 9 that are adjacent to each other in the tire circumferential direction with respect to the tire radial direction with the end on the inner side in the tire radial direction as a reference point satisfies the range of +1°≤θ≤+60° with respect to the tire rotational direction for one, and the other satisfies the range of −60°≤θ≤−1°.

In this manner, by making the angle θ of the ridges 9 with respect to the tire radial direction not more than +60° and not less than −60°, it is possible to obtain a significant effect of reduction of air resistance. Also, by making the angle θ of the ridges 9 with respect to the tire radial direction not less than +1° and not more than −1°, it is possible to obtain a significant effect of improvement in uniformity of the pneumatic tire 1.

Also, as illustrated in FIGS. 30 to 34, preferably, the ridges 9 are formed as a row of fins 9A divided in the longitudinal direction into a plurality of fins 91, with each of the fins 91 of the row of fins 9A overlapping in the tire circumferential direction at least with the nearest fin, so that overall the row of fins 9A extends from the inner side to the outer side in the tire radial direction including the maximum tire width position S'. When the ridge 9 is divided into the plurality of fins 91, the space between the fins 91 may be lower than the projection height of the fin 91 (ridge 9), it may protrude from the tire side section 11, or it may coincide with the tire side section 11.

Figure 30:
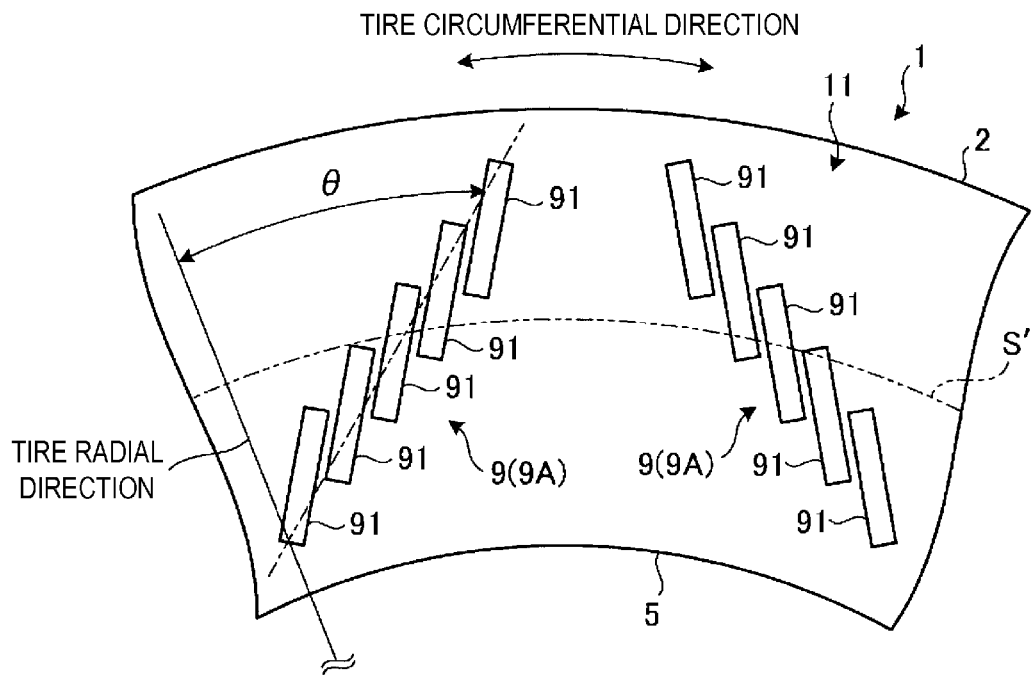
FIG. 30 is a schematic side view illustrating a modified example of ridges on a pneumatic tire of the vehicle air resistance reduction structure according to an embodiment of the present technology.

In FIG. 30, the ridges 9 are formed as a rows of fins 9A divided into five straight fins in the longitudinal direction, the projections in the tire circumferential direction of the nearest fins 91 overlap, with end portions overlapping, and extending overall from the inner side to the outer side in the tire radial direction. In this case, the angle θ of the row of fins 9A constituting the ridge 9 with respect to the tire radial direction is the angle θ of inclination of the extension direction with respect to the tire radial direction, where the extension direction is the straight line connecting the center in the lateral direction (direction intersecting the longitudinal direction) of the end on the inner side in the tire radial direction of the fin 91 disposed on the innermost side in the tire radial direction, and the center in the lateral direction of the end on the outer side in the tire radial direction of the fin 91 disposed on the innermost side in the tire radial direction.

Figure 31:
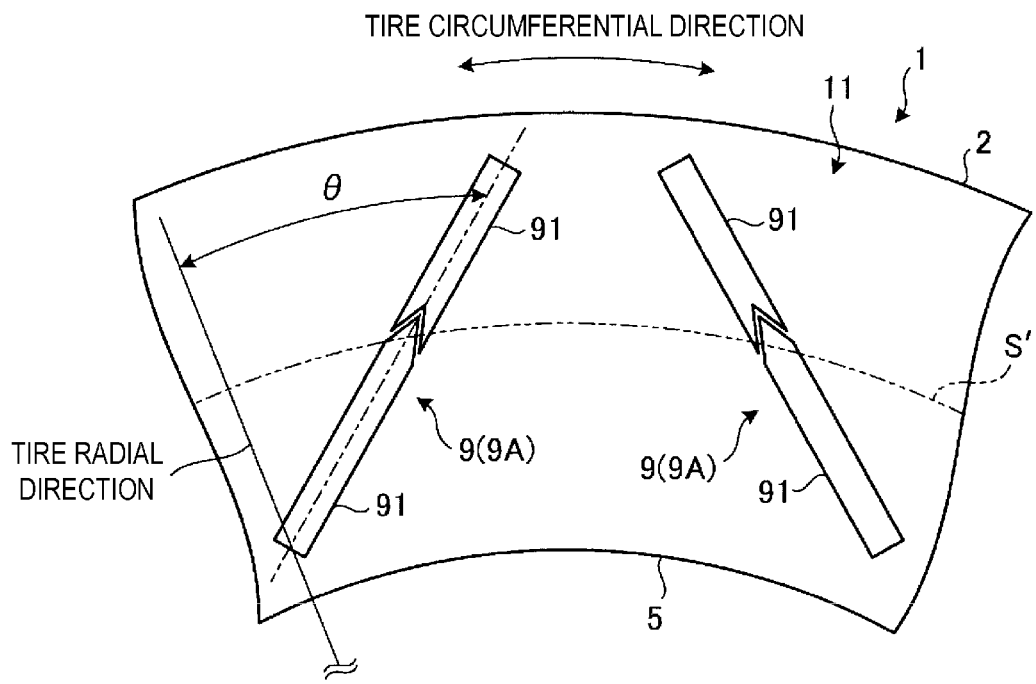
FIG. 31 is a schematic side view illustrating a modified example of ridges on a pneumatic tire of the vehicle air resistance reduction structure according to an embodiment of the present technology.

In FIG. 31, the straight ridges 9 are formed as rows of fins 9A divided into two fins 91 in the longitudinal direction, the projections of the nearest fins 91 overlap in the tire circumferential direction, with end portions overlapping in a recess and a ridge, and extending overall in the inner side and the outer side of the tire radial direction. In this case, the angle θ of the row of fins 9A constituting the ridge 9 with respect to the tire radial direction is the angle θ of inclination of the extension direction with respect to the tire radial direction, where the extension direction is the straight line connecting the center in the lateral direction (direction intersecting the longitudinal direction) of the end on the inner side in the tire radial direction of the fin 91 disposed on the innermost side in the tire radial direction, and the center in the lateral direction of the end on the outer side in the tire radial direction of the fin 91 disposed on the innermost side in the tire radial direction.

Figure 32:
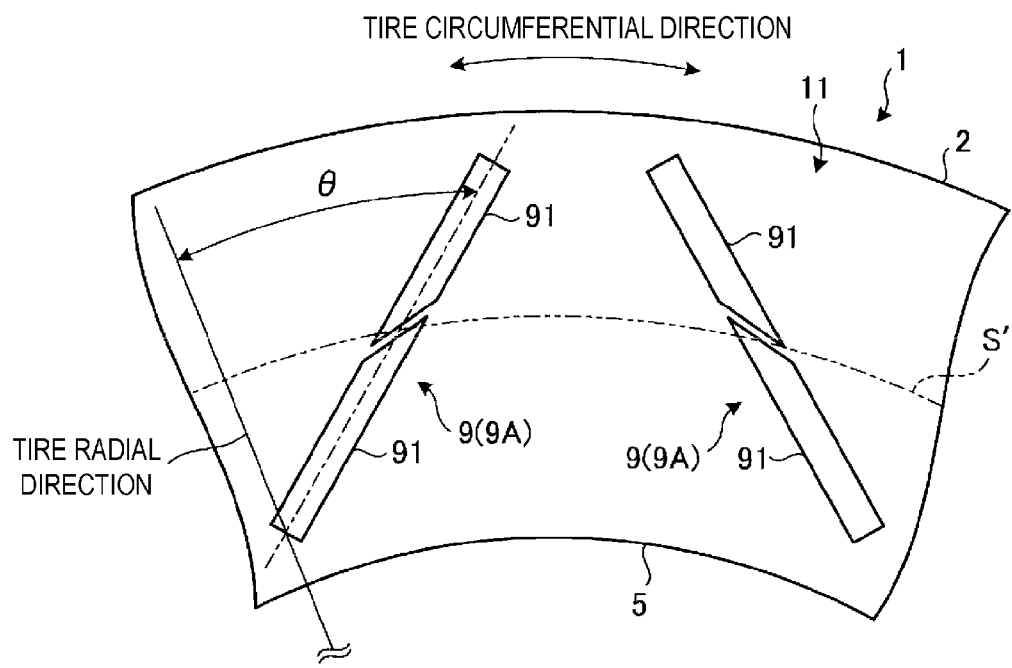
FIG. 32 is a schematic side view illustrating a modified example of ridges on a pneumatic tire of the vehicle air resistance reduction structure according to an embodiment of the present technology.

In FIG. 32, the straight ridges 9 are formed as rows of fins 9A divided into two fins 91 in the longitudinal direction, the projections of the nearest fins 91 overlap in the tire circumferential direction, with end portions overlapping at an inclination to each other, and extending overall in the inner side and the outer side of the tire radial direction. In this case, the angle θ of the row of fins 9A constituting the ridge 9 with respect to the tire radial direction is the angle θ of inclination of the extension direction with respect to the tire radial direction, where the extension direction is the straight line connecting the center in the lateral direction (direction intersecting the longitudinal direction) of the end on the inner side in the tire radial direction of the fin 91 disposed on the innermost side in the tire radial direction, and the center in the lateral direction of the end on the outer side in the tire radial direction of the fin 91 disposed on the innermost side in the tire radial direction.

Figure 33:
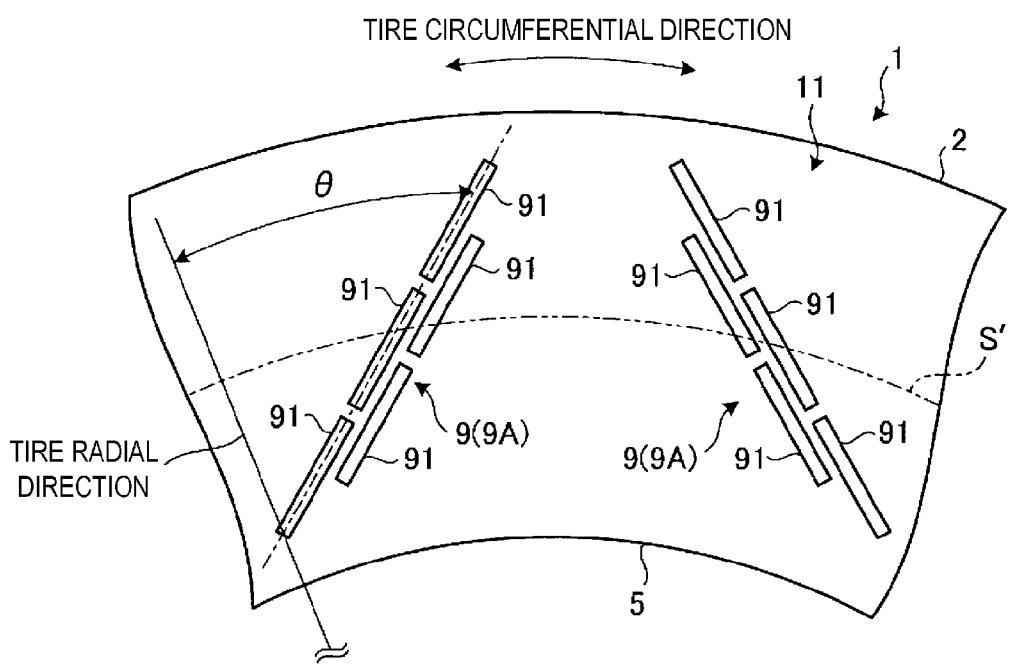
FIG. 33 is a schematic side view illustrating a modified example of ridges on a pneumatic tire of the vehicle air resistance reduction structure according to an embodiment of the present technology.

In FIG. 33, the ridges 9 are formed as rows of fins 9A divided into five straight fins 91 in the longitudinal direction, three fins 91 aligned in a straight line extending in the inner side and the outer side of the tire radial direction and two fins 91 aligned in a straight line extending in the inner side and the outer side of the tire radial direction are disposed parallel to each other in a linear manner, so that the projections in the tire circumferential direction of the closest fins overlap each other, with the ends of two fins 91 overlapping with one fin 91, and overall extending in a straight line in the inner side and the outer side of the tire radial direction. In this case, the angle θ of the row of fins 9A constituting the ridge 9 with respect to the tire radial direction is the angle θ of inclination of the extension direction with respect to the tire radial direction, where the extension direction is the straight line connecting the center in the lateral direction (direction intersecting the longitudinal direction) of the end on the inner side in the tire radial direction of the fin 91 disposed on the innermost side in the tire radial direction, and the center in the lateral direction of the end on the outer side in the tire radial direction of the fin 91 disposed on the innermost side in the tire radial direction.

Figure 34:
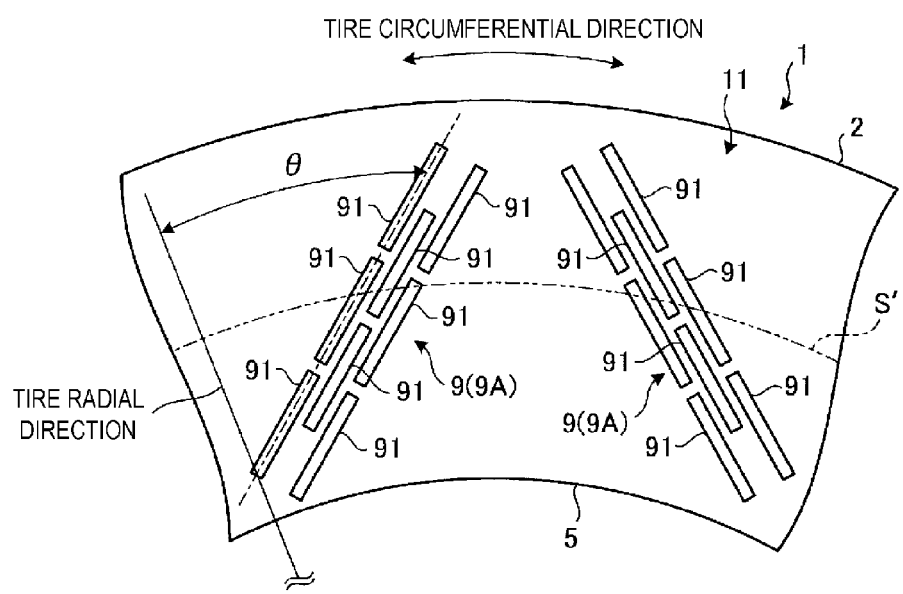
FIG. 34 is a schematic side view illustrating a modified example of ridges on a pneumatic tire of the vehicle air resistance reduction structure according to an embodiment of the present technology.

In FIG. 34, the ridges 9 are formed as rows of fins 9A divided into eight straight fins 91 in the longitudinal direction, two fins 91 aligned in a straight line extending in the inner side and the outer side of the tire radial direction are disposed parallel to each other in a linear manner between three fins 91 aligned in a straight line extending in the inner side and the outer side of the tire radial direction and three fins 91 aligned in a straight line extending in the inner side and the outer side of the tire radial direction, so that the projections in the tire circumferential direction of the closest fins 91 overlap each other, with the ends of four fins 91 overlapping with one fin 91, and overall extending in a linear manner in the inner side and the outer side of the tire radial direction. In this case, the angle θ of the row of fins 9A constituting the ridge 9 with respect to the tire radial direction is the angle θ of inclination of the extension direction with respect to the tire radial direction, where the extension direction is the straight line connecting the center in the lateral direction (direction intersecting the longitudinal direction) of the end on the inner side in the tire radial direction of the fin 91 disposed on the innermost side in the tire radial direction, and the center in the lateral direction of the end on the outer side in the tire radial direction of the fin 91 disposed on the innermost side in the tire radial direction.

The form and arrangement of the fins 91 of the row of fins 9A that constitute the ridges 9 are not limited to those forms illustrated in FIGS. 30 to 34.

In this manner, by forming the ridges 9 as a row of fins 9A divided into a plurality of fins 91, when the tire side section 11 flexes the strain is dispersed in each individual fin, so the stiffness due to the ridges 9 is further kept to a minimum, so it is possible to obtain a more significant effect of improvement in uniformity of the pneumatic tire 1, and the durability of the ridges 9 can be improved.

EXAMPLES

In the present examples, simulation tests for the air resistance improvement ratio were carried out for a plurality of types of vehicle air resistance reduction structures under different conditions (see FIGS. 35A-35B, 36A-36B).

In the simulation tests, a coefficient of aerodynamic drag of a vehicle model traveling at a speed of 80 km/h was calculated by the lattice Boltzmann method using fluid analysis software. The vehicle model was a body model of a passenger vehicle with motor assist, on which tire models of tire size 195/65R15 were mounted. With this coefficient evaluation, the larger the coefficient the better the air resistance improvement ratio.

In FIGS. 35A-35B, the Conventional Example did not have a protrusion in the tire house, and the pneumatic tires did not have ridges and recesses on the tire side section. Also, Comparative Example 1 did not have a protrusion in the tire house, but the pneumatic tires had ridges on the tire side section on the vehicle inner side. Comparative Example 2 did have a protrusion in the tire house, but the pneumatic tires did not have ridges and recesses on the tire side section. Note that when there was a protrusion, it was provided continuously along the shape of the tire house 101 covering the periphery of the pneumatic tire 1.

In FIGS. 35A-35B and 36A-36B, Working Example 1 to Working Example 20 did have a protrusion in the tire house, and the pneumatic tires had ridges and recesses on the tire side section. The relationship Hp/S between the maximum distance Hp of the ridges from the surface of the tire side section and the tire cross-sectional width S, and the relationship Hd/S between the maximum distance Hd of the recesses and the tire cross-sectional width S were specified. Note that when there was a protrusion, it was provided continuously along the shape of the tire house 101 covering the periphery of the pneumatic tire 1. Working Example 1 had ridges on the tire side section on the vehicle inner side of the pneumatic tire. Working Example 2 had ridges on the tire side section on the vehicle outer side of the pneumatic tire. Working Example 3 had recesses on the tire side section on the vehicle inner side of the pneumatic tire. Working Example 4 had recesses on the tire side section on the vehicle outer side of the pneumatic tire. Working Example 5 and Working Example 6 had ridges on the tire side section on the vehicle outer side of the pneumatic tires, and recesses on the tire side section on the vehicle inner side. Working Example 7 to Working Example 20 had ridges on the tire side section on the vehicle inner side of the pneumatic tires, and recesses on the tire side section on the vehicle outer side.

From the simulation results shown in FIGS. 35A-35B and 36A-36B, it can be seen that the air resistance of the vehicle was improved for Working Example 1 to Working Example 20.

What is claimed is:

1. A vehicle air resistance reduction structure, comprising:
   a tire house of a vehicle; and
   a pneumatic tire mounted within the tire house; wherein
   in a state in which the pneumatic tire is mounted on the vehicle, and a rotational axis of the pneumatic tire is disposed so that the vehicle can move forward,
   a protrusion projecting from an inner wall surface of the tire house towards a rotational axis side is provided on a tire house side in a range from a tire cross-sectional width edge that corresponds to a vehicle inner side of the pneumatic tire to a vehicle outer side; and
   a plurality of ridges and/or recesses is provided on at least one tire side section on the pneumatic tire side, a maximum distance of the ridges from a surface of the tire side section being Hp, a maximum distance of the recesses from the surface of the tire side section being Hd, a tire cross-sectional width of the pneumatic tire being S, and ranges $0.005 \leq Hp/S \leq 0.05$ and/or $0.001 \leq Hd/S \leq 0.01$ are satisfied.

2. The vehicle air resistance reduction structure according to claim 1, wherein in the range from the tire cross-sectional width edge that corresponds to the vehicle inner side of the pneumatic tire to the vehicle outer side, upon a shortest distance from a projecting tip of the protrusion to the rotational axis being O, a maximum value of a shortest distance from the inner wall surface of the tire house to the rotational axis being L, and a tire radius being r, a range $0.01 \leq (L-O)/r \leq 0.5$ is satisfied.

3. The vehicle air resistance reduction structure according to claim 1, wherein the plurality of ridges provided on the pneumatic tire extend longitudinally from an inner side to an outer side in a tire radial direction, and is disposed at intervals in a tire circumferential direction, and upon a height of projection from the surface of the tire side section being hp, a width in a longitudinal direction being wp, and a number of the ridges on one of the tire side sections being Np, a range $5 \leq Np \cdot hp/wp \leq 200$ is satisfied.

4. The vehicle air resistance reduction structure according to claim 1, wherein upon a depth of the recesses provided on the pneumatic tire from the surface of the tire side section being hd, a diameter dimension of an opening of the recesses being wd, and a number of the recesses on one of the tire side sections being Nd, a range $1 \leq Nd \cdot hd/wd \leq 10000$ is satisfied.

5. The vehicle air resistance reduction structure according to claim 1, wherein a height hp of projection of the ridges provided on the pneumatic tire from the surface of the tire side section satisfies a range not less than 1 mm and not more than 10 mm.

6. The vehicle air resistance reduction structure according to claim 1, wherein a depth hd of the recesses provided on the pneumatic tire from the surface of the tire side section satisfies a range not less than 0.3 mm and not more than 2 mm.

7. The vehicle air resistance reduction structure according to claim 1, wherein the ridges provided on the pneumatic tire are disposed on the tire side section that corresponds to the vehicle inner side when the pneumatic tire is mounted on the vehicle.

8. The vehicle air resistance reduction structure according to claim 1, wherein the recesses provided on the pneumatic tire are disposed on the tire side section that corresponds to the vehicle outer side when the pneumatic tire is mounted on the vehicle.

9. A vehicle including a tire house and a tire disposed within the tire house, the vehicle comprising
the vehicle air resistance reduction structure according to claim 1.

10. The vehicle air resistance reduction structure according to claim 2, wherein the plurality of ridges provided on the pneumatic tire extend longitudinally from an inner side to an outer side in a tire radial direction, and is disposed at intervals in a tire circumferential direction, and upon a height of projection from the surface of the tire side section being hp, a width in a longitudinal direction being wp, and a number of the ridges on one of the tire side sections being Np, a range $5 \leq Np \cdot hp/wp \leq 200$ is satisfied.

11. The vehicle air resistance reduction structure according to claim 10, wherein upon a depth of the recesses provided on the pneumatic tire from the surface of the tire side section being hd, a diameter dimension of an opening of the recesses being wd, and a number of the recesses on one of the tire side sections being Nd, a range $1 \leq Nd \cdot hd/wd \leq 10000$ is satisfied.

12. The vehicle air resistance reduction structure according to claim 11, wherein a height hp of projection of the ridges provided on the pneumatic tire from the surface of the tire side section satisfies a range not less than 1 mm and not more than 10 mm.

13. The vehicle air resistance reduction structure according to claim 12, wherein a depth hd of the recesses provided on the pneumatic tire from the surface of the tire side section satisfies a range not less than 0.3 mm and not more than 2 mm.

14. The vehicle air resistance reduction structure according to claim 13, wherein the ridges provided on the pneumatic tire are disposed on the tire side section that corresponds to the vehicle inner side when the pneumatic tire is mounted on the vehicle.

15. The vehicle air resistance reduction structure according to claim 14, wherein the recesses provided on the pneumatic tire are disposed on the tire side section that corresponds to the vehicle outer side when the pneumatic tire is mounted on the vehicle.

* * * * *